(12) United States Patent
Rosevear et al.

(10) Patent No.: US 6,478,922 B1
(45) Date of Patent: Nov. 12, 2002

(54) METHOD OF MANUFACTURING A COMPOSITE STRUCTURE USING A CONFORMABLE LOCATING APERTURE SYSTEM

(75) Inventors: Todd A. Rosevear, Taylorsville, UT (US); Mark M. Wheeler, Kamas, UT (US)

(73) Assignee: Alliant Techsystems Inc., Edina, MN (US)

( * ) Notice: Subject to any disclaimer, the term of this patent is extended or adjusted under 35 U.S.C. 154(b) by 109 days.

(21) Appl. No.: 09/594,920

(22) Filed: Jun. 15, 2000

(51) Int. Cl.[7] .............................................. B32B 31/04
(52) U.S. Cl. ..................... 156/297; 156/285; 264/257; 264/263; 264/313; 264/319; 244/120; 244/124
(58) Field of Search ................................ 156/285–286, 156/289, 297; 244/119–120, 123–128; 269/40–42, 45, 290, 292, 293, 294, 309; 249/160; 425/DIG. 44; 264/241, 248, 257, 263, 313, 319

(56) References Cited

U.S. PATENT DOCUMENTS

| | | | | |
|---|---|---|---|---|
| 5,242,523 A | * | 9/1993 | Willden et al. | 156/245 |
| 5,484,277 A | * | 1/1996 | Lindsay | 249/134 |
| 6,245,275 B1 | * | 6/2001 | Holsinger | 249/127 |
| 6,391,246 B2 | * | 5/2002 | Shiraishi et al. | 156/289 |

OTHER PUBLICATIONS

International Search Report dated Jan. 31, 2002.

* cited by examiner

*Primary Examiner*—Jeff H. Aftergut
*Assistant Examiner*—Jessica Rossi
(74) *Attorney, Agent, or Firm*—TraskBritt

(57) ABSTRACT

A method and apparatus for the manufacture of fiber reinforced structures including the tooling and its use in the manufacture of reinforced structures. The apparatus comprises a conformable locating aperture system (CLAS) used for the formation of composite structures. The method includes the use in the formation of a structure and the method of manufacture of a structure.

13 Claims, 14 Drawing Sheets

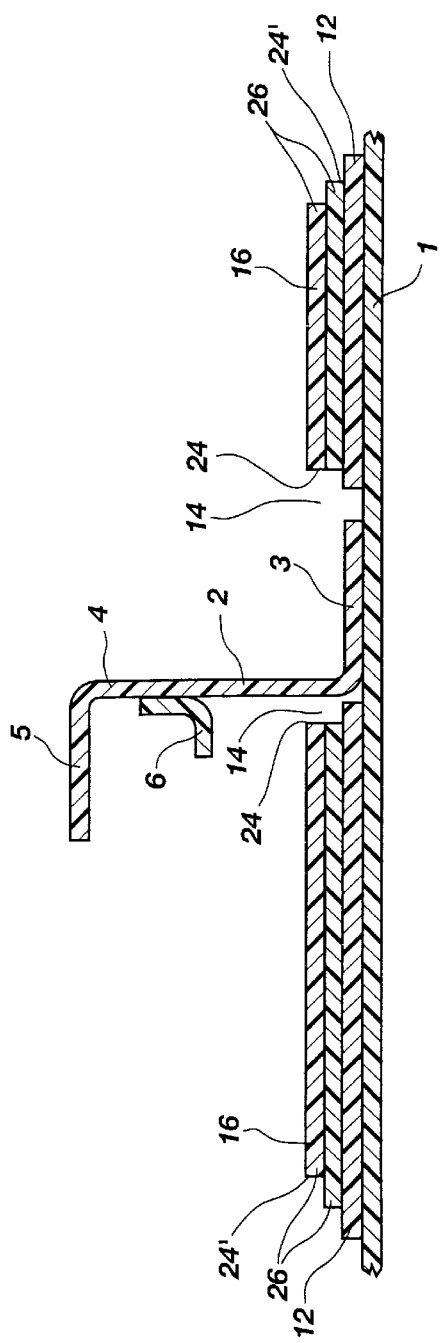
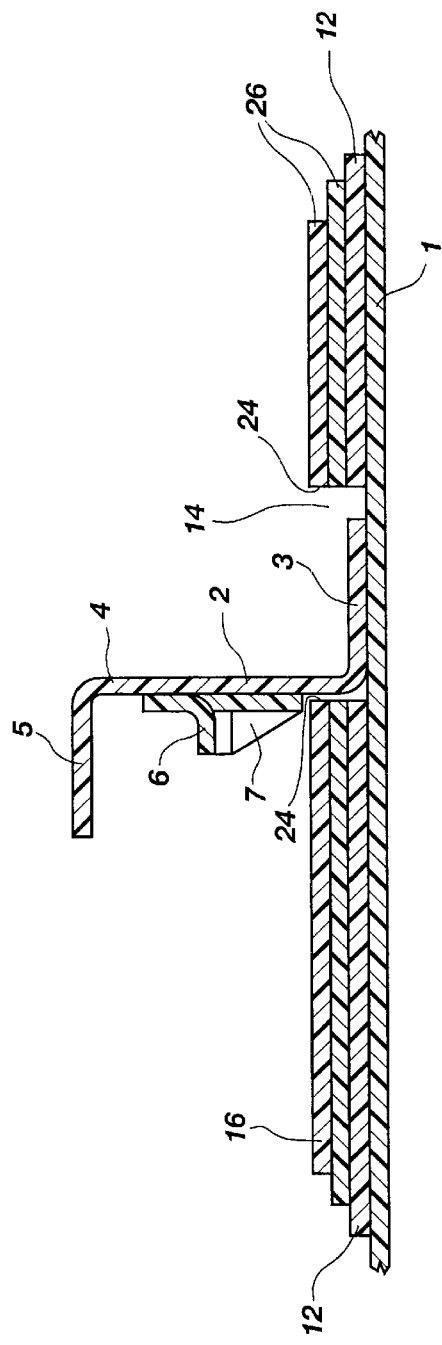

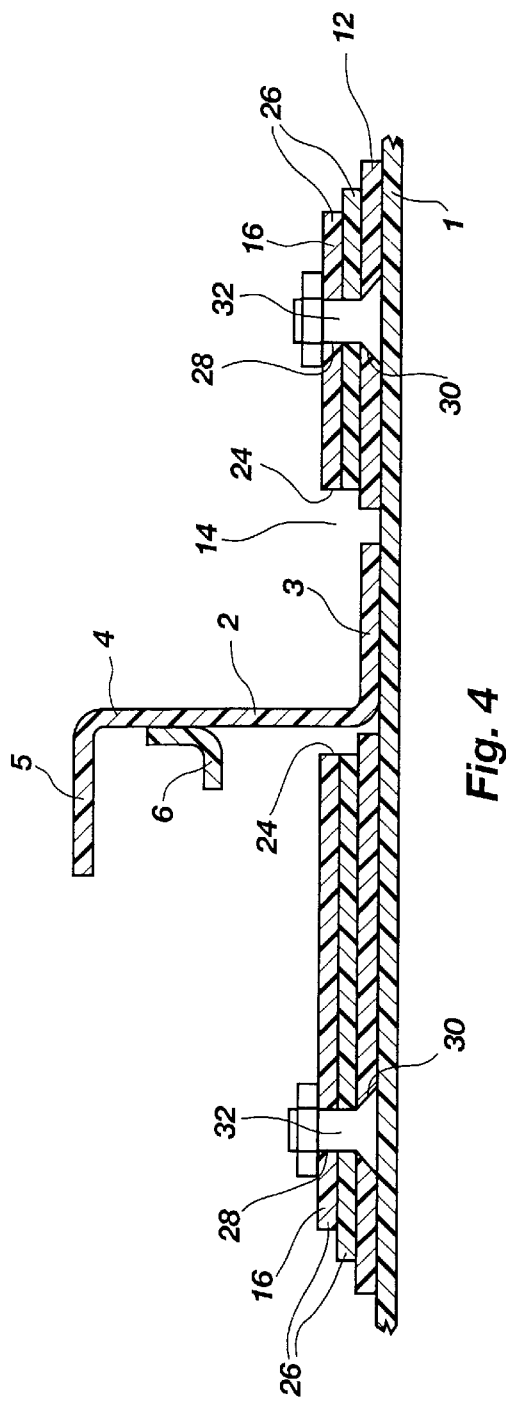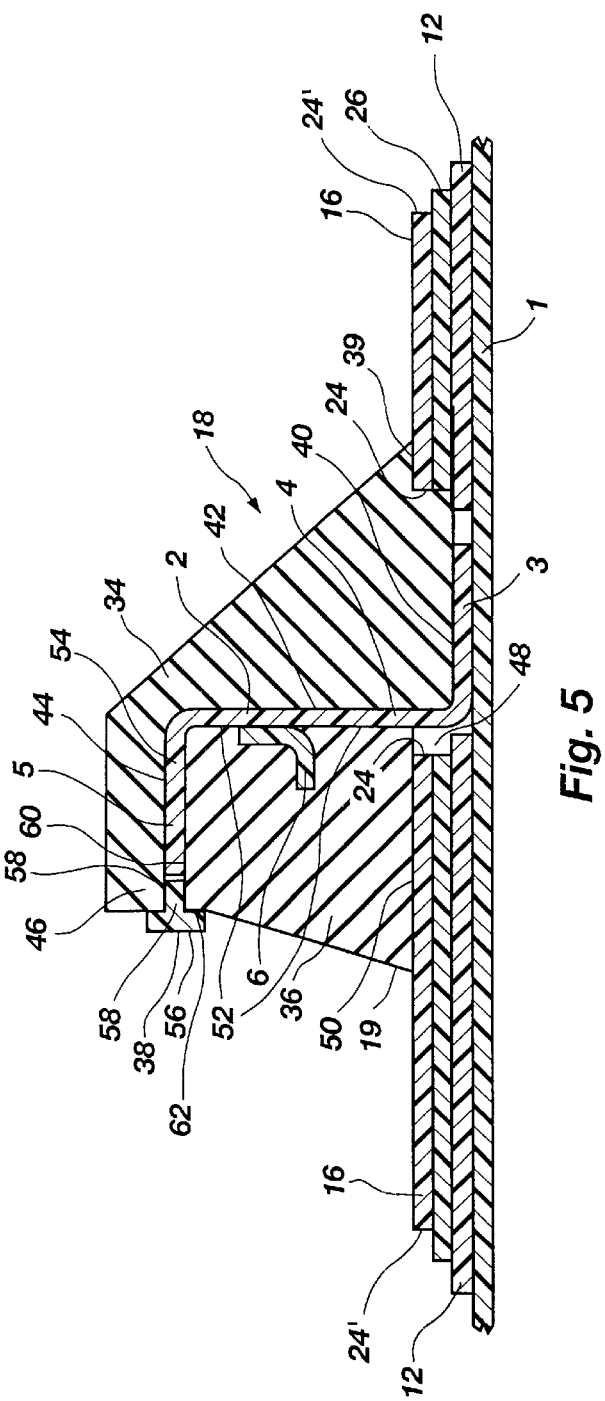

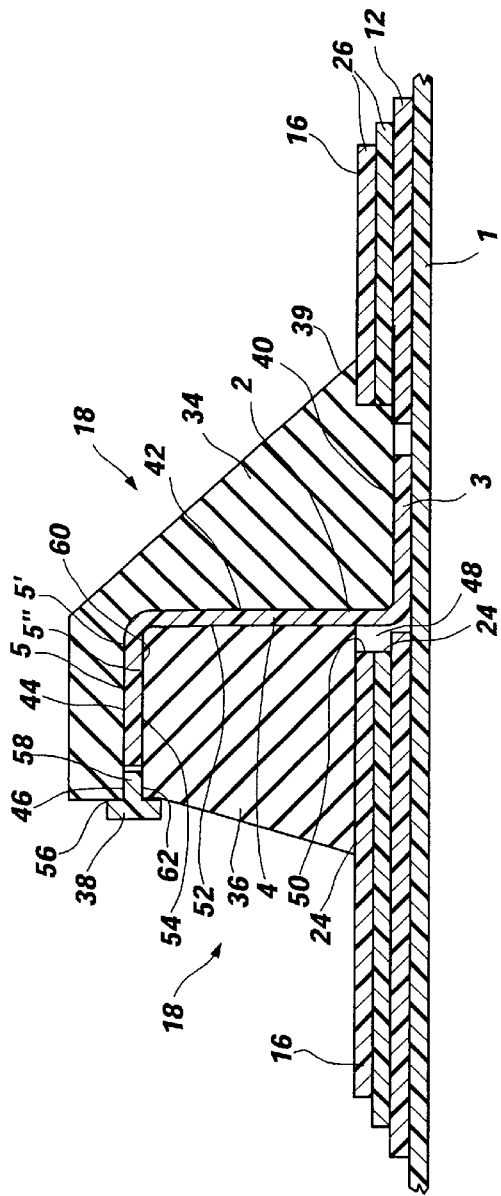
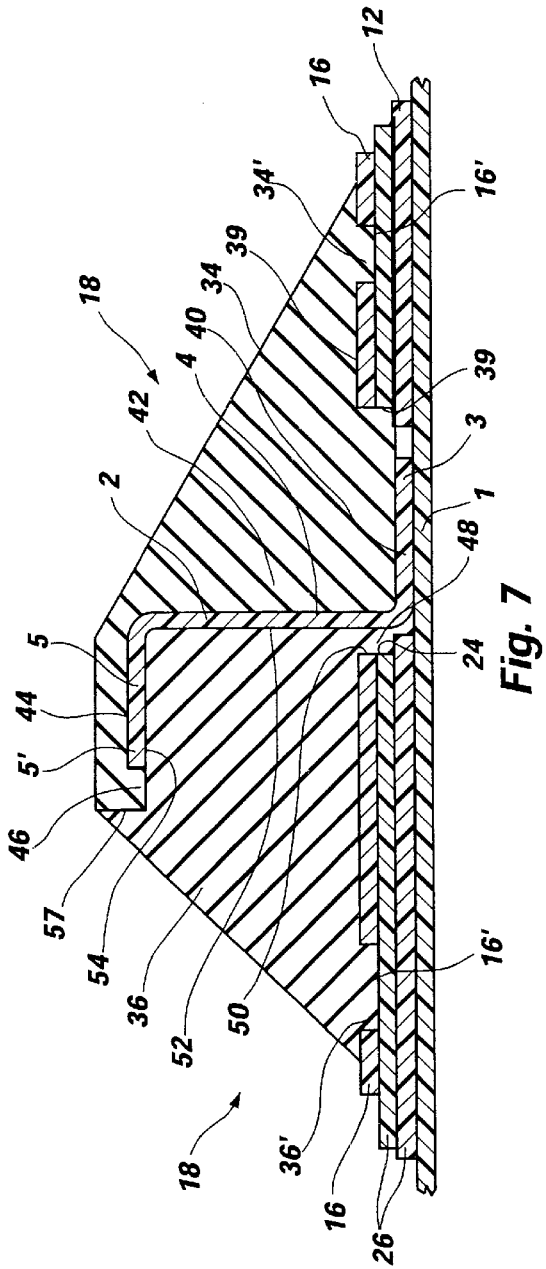
Fig. 6
Fig. 7

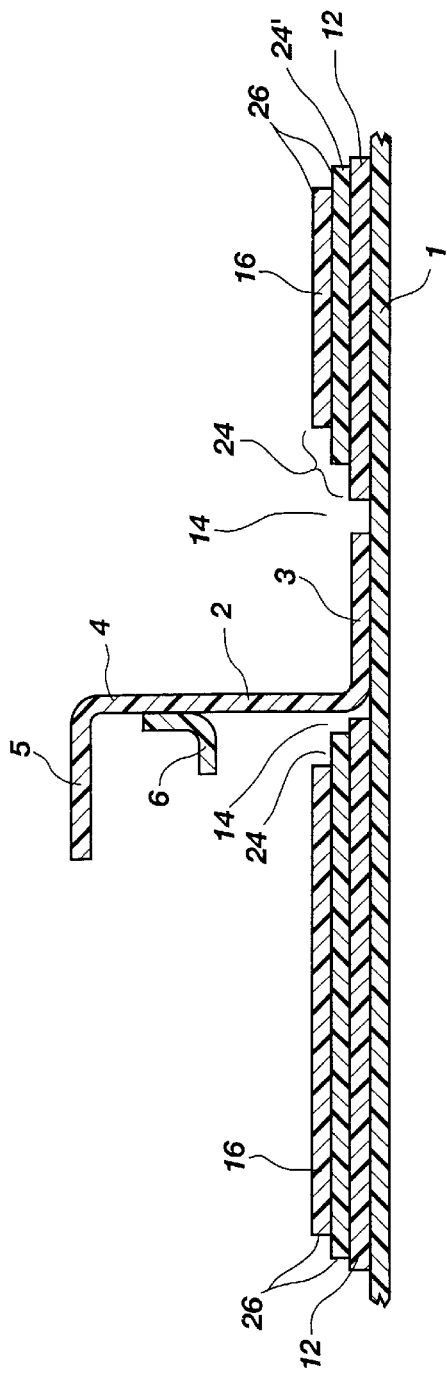
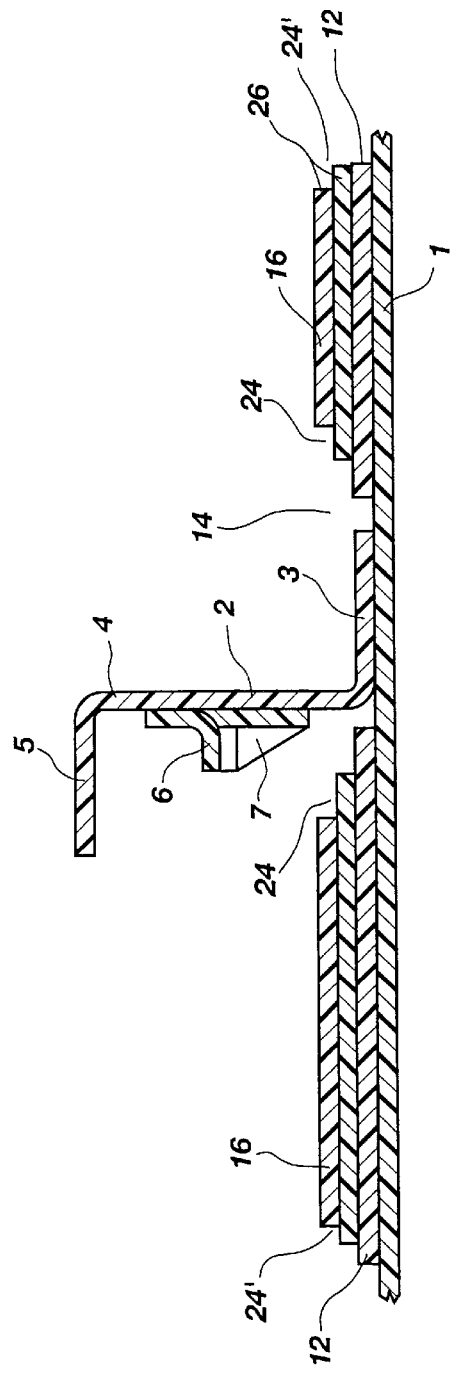

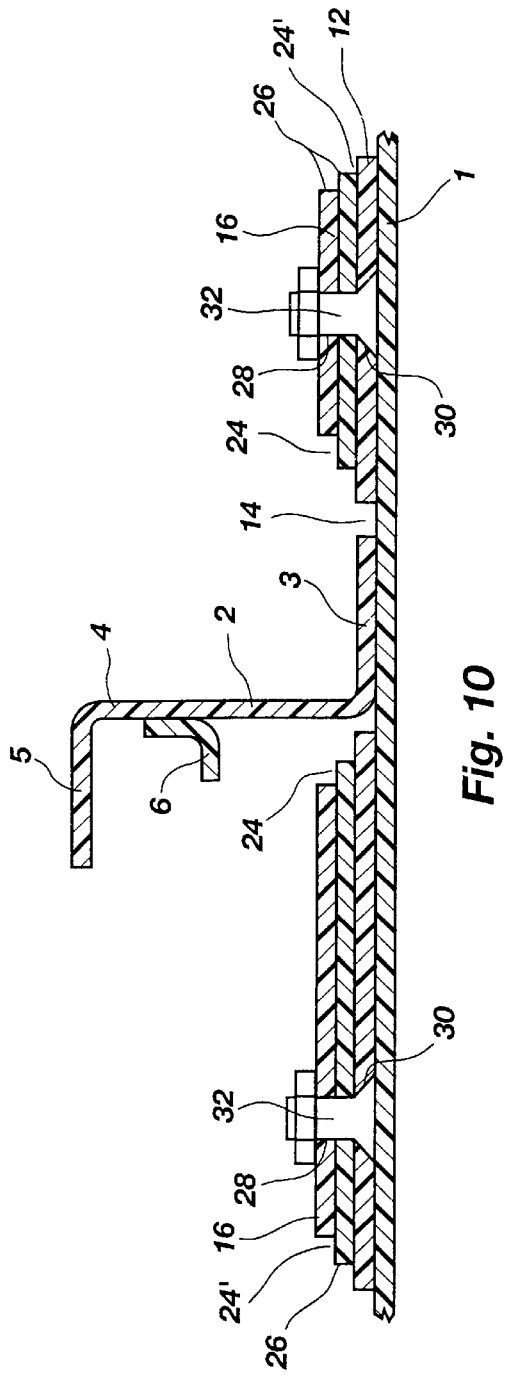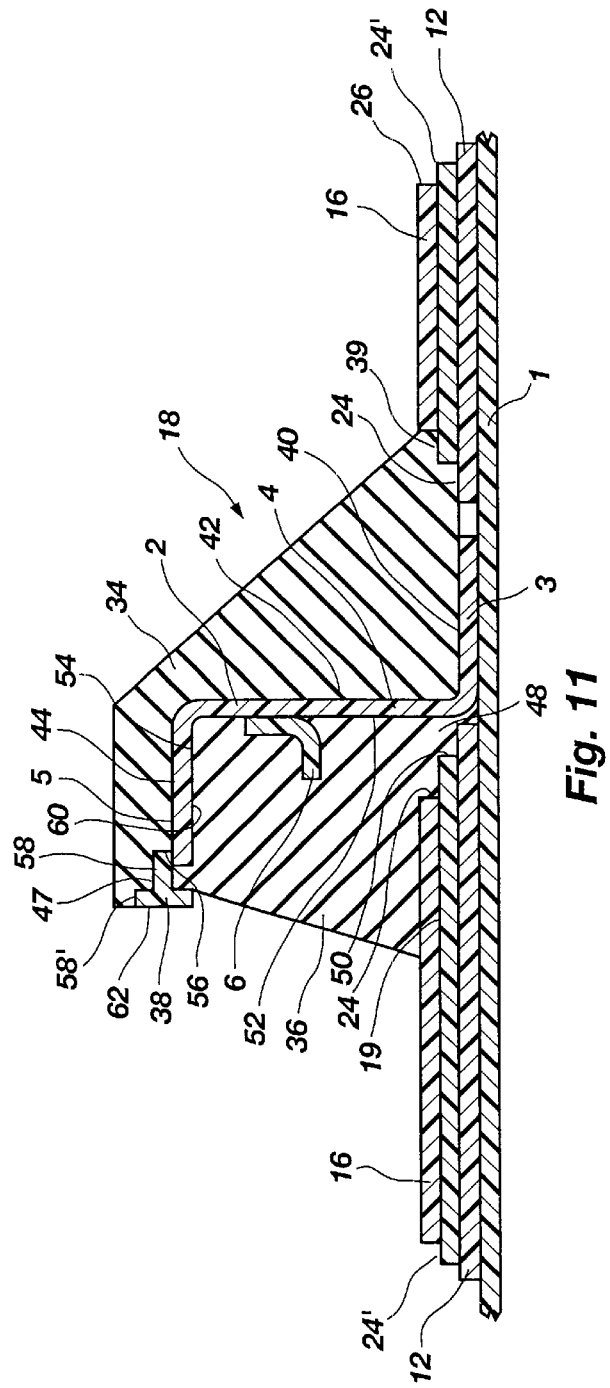

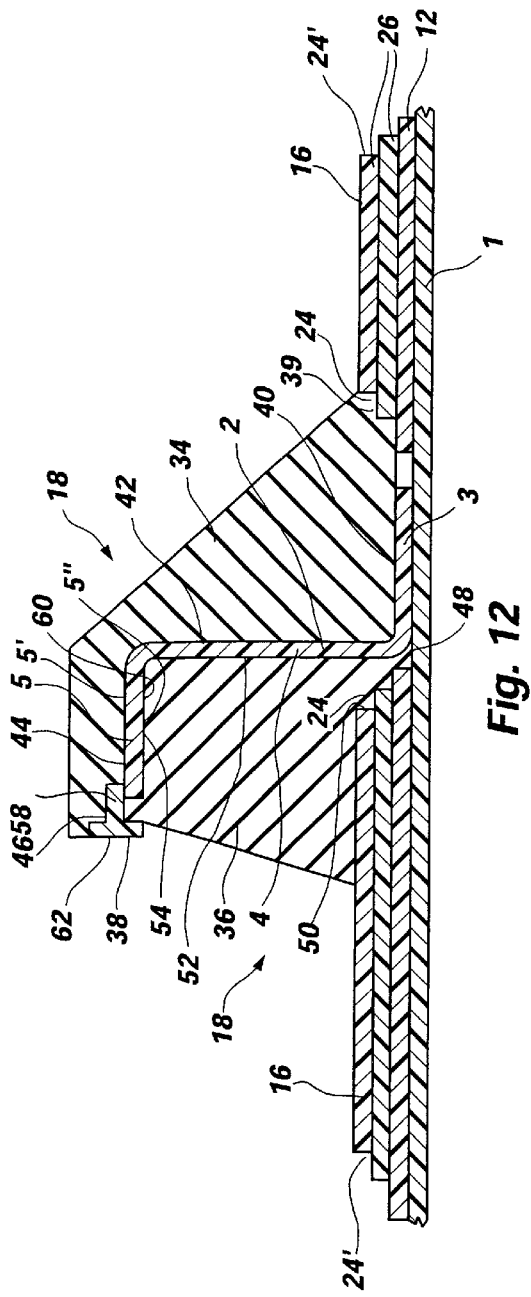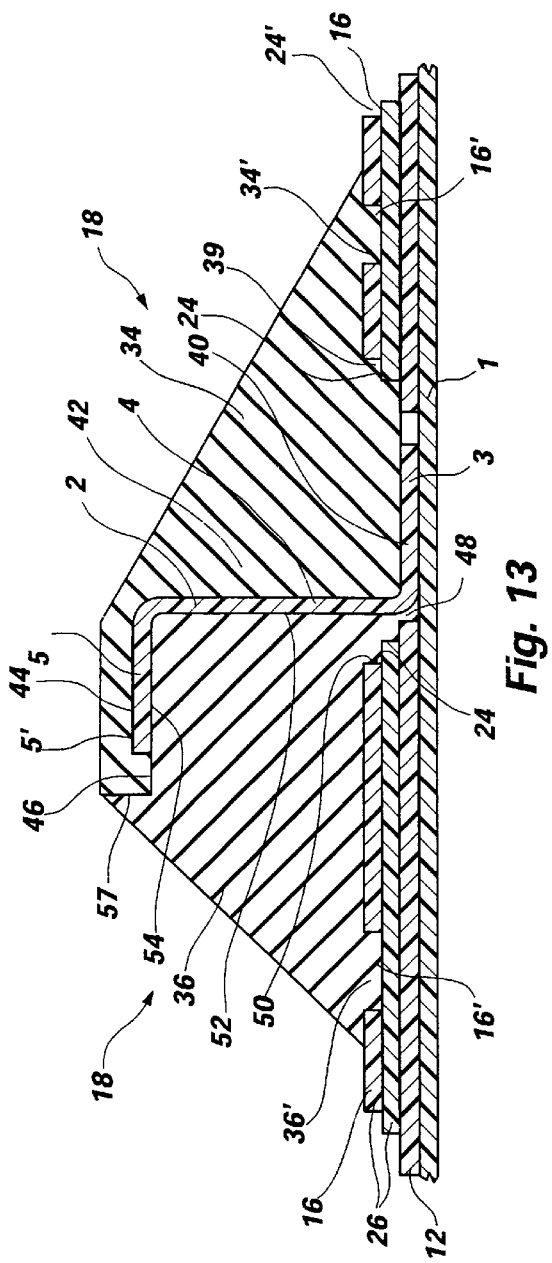

METHOD OF MANUFACTURING A COMPOSITE STRUCTURE USING A CONFORMABLE LOCATING APERTURE SYSTEM

BACKGROUND OF THE INVENTION

This invention relates to the method and apparatus for the manufacture of fiber reinforced structures.

State of the Art: It is desirable to have inexpensive, strong, lightweight, easily manufactured, dimensionally accurate components in a variety of sizes and geometries for use in aircraft and aerospace applications or any application where such structures are suited for use. However, meeting such criteria for components is difficult.

For example, the airframe of commercial aircraft is typically constructed of aluminum forgings, titanium forgings, aluminum sheet metal, and if desired, titanium sheet metal and is powered using turbofan type engines. High strength, low weight materials are used in the airframe in order to maximize the maneuverability of the aircraft, the responsiveness of the aircraft, the payload capacity of the aircraft, and the range of the aircraft. For instance, in commercial aircraft the main wing spar is typically a machined high strength aluminum forging extending most of the wing span of the aircraft including the fuselage in order to provide high strength and low weight to the wings of the aircraft and fuselage. In other instances, various portions of the wings and fuselage of an aircraft are fabricated from an aluminum sheet. As the wings and fuselage are formed of complex geometric shapes, it is difficult to fabricate sheet aluminum or sheet titanium into assemblies having high strength and low weight as the various portions of the assemblies are secured together through the use of fasteners which add weight to the assembly.

Similarly, where possible, high strength, low weight materials are used in the aircraft engines and the nacelles of an aircraft. For instance in a commercial aircraft, a turbofan type engine includes a ducted fan, a large diameter axial-flow multi-stage compressor, as the primary source of thrust by the engine while the gas generator portion of the engine provides a smaller amount of the engine's thrust. The turbofan type engine being contained in an engine nacelle attached to the aircraft, typically, being attached to a portion of a wing or fuselage.

Since weight is of concern in aircraft engines and the nacelle containing the engine, it is desirable to provide the lightest engine and nacelle structure possible to meet the operational criteria for the aircraft while providing the required aircraft operational safety criteria. Typically, one of the desired operational safety characteristics for a turbofan aircraft engine is that if a fan blade, a compressor blade, or a turbine blade catastrophically fails during engine operation, the blade or pieces of the blade be contained or caught within either a portion of the engine housing or the nacelle. Typically, aircraft manufactures have required the fan housing be such a structure for the engine thereby making the fan housing one of the heaviest engine components. Accordingly, other portions of the nacelle are required to retain portions of compressor blades or turbine blades, if the engine structure itself, such as a compressor housing or turbine housing are not strong enough to retain the failed engine part.

The design of inexpensive, strong, lightweight, easily manufactured, dimensionally accurate nacelle components of sizes and geometries for use in aircraft is a formidable task. For instance, a fan housing must be strong enough to contain the energy of a fan blade when the failure occurs at maximum engine speed, must be dimensionally accurate over a range of engine operating conditions, must be easily manufactured at a reasonable cost, must be low weight, etc. Fan housings have been metal structures using a variety of reinforcing grids, typically formed of metal. However, such fan housings are expensive, difficult to manufacture, require extensive tooling to manufacture to close tolerances, and heavy.

In other instances, some fan housings have been composite type structures including metal components and non-metallic or organic type reinforcing components in an attempt to provide a high strength, low weight structure capable of containing a broken fan blade. However, such composite type structures are difficult to construct because the reinforcing structure of non-metallic materials for the fan housing has been difficult and expensive to construct. Other portions of the nacelle have complex geometric shapes to properly control the flow of air around the engine, wing, and fuselage making such components difficult to manufacture as metal assemblies.

Therefore, a need exists for a method and apparatus for the fabrication of composite structures for various aircraft components of the wings and fuselage to replace metal assemblies. Similarly, a need exists for a method and apparatus for fabrication of composite structures for aerospace vehicles and the like, Such methods and apparatus for the fabrication of composite structures for aircraft, or aerospace vehicles, or any application where low weight and high strength are required, must be capable of manufacturing an assembly that has structural integrity, reliability in operation, repeatability of manufacture, dimensional control of the structure, and a reasonable cost for the composite structure.

SUMMARY OF THE INVENTION

The present invention relates to the method and apparatus for the manufacture of fiber reinforced structures. The present invention includes the tooling and its use for the manufacture of reinforced structures. The present invention comprises a conformable locating aperture system (CLAS) used for the formation of composite structures.

BRIEF DESCRIPTION OF THE SEVERAL VIEWS OF THE DRAWING

FIG. 2 is a cross-sectional view taken along line 2—2 of drawing FIG. 1 illustrating a portion of the present invention;

FIG. 3 is a cross-sectional view taken along line 2—2 of drawing FIG. 1 illustrating a portion of an alternative embodiment of the present invention;

FIG. 4 is a cross-sectional view taken along line 2—2 of drawing FIG. 1 illustrating a portion of a alternative embodiment of the present invention;

FIG. 5 is a cross-sectional view taken along line 2—2 of drawing FIG. 1 illustrating a portion of the present invention;

FIG. 6 is a cross-sectional view taken along line 2—2 of drawing FIG. 1 illustrating a portion of the present invention;

FIG. 7 is a cross-sectional view taken along line 2—2 of drawing FIG. 1 illustrating a portion of the present invention;

FIG. 8 is a cross-sectional view taken along line 2—2 of drawing FIG. 1 illustrating a portion of an alternative embodiment of the present invention;

FIG. 9 is a cross-sectional view taken along line 2—2 of drawing FIG. 1 illustrating a portion of an alternative embodiment of the present invention;

FIG. 10 is a cross-sectional view taken along line 2—2 of drawing FIG. 1 illustrating a portion of an alternative embodiment of the present invention;

FIG. 11 is a cross-sectional view taken along line 2—2 of drawing FIG. 1 illustrating a portion of an alternative embodiment of the present invention;

FIG. 12 is a cross-sectional view taken along line 2—2 of drawing FIG. 1 illustrating a portion of an alternative embodiment of the present invention;

FIG. 13 is a cross-sectional view taken along line 2—2 of drawing FIG. 1 illustrating a portion of an alternative embodiment of the present invention;

The present invention will be better understood when the drawings are taken in conjunction with the description of the invention set forth hereafter.

DETAILED DESCRIPTION OF THE INVENTION

Figure 1:
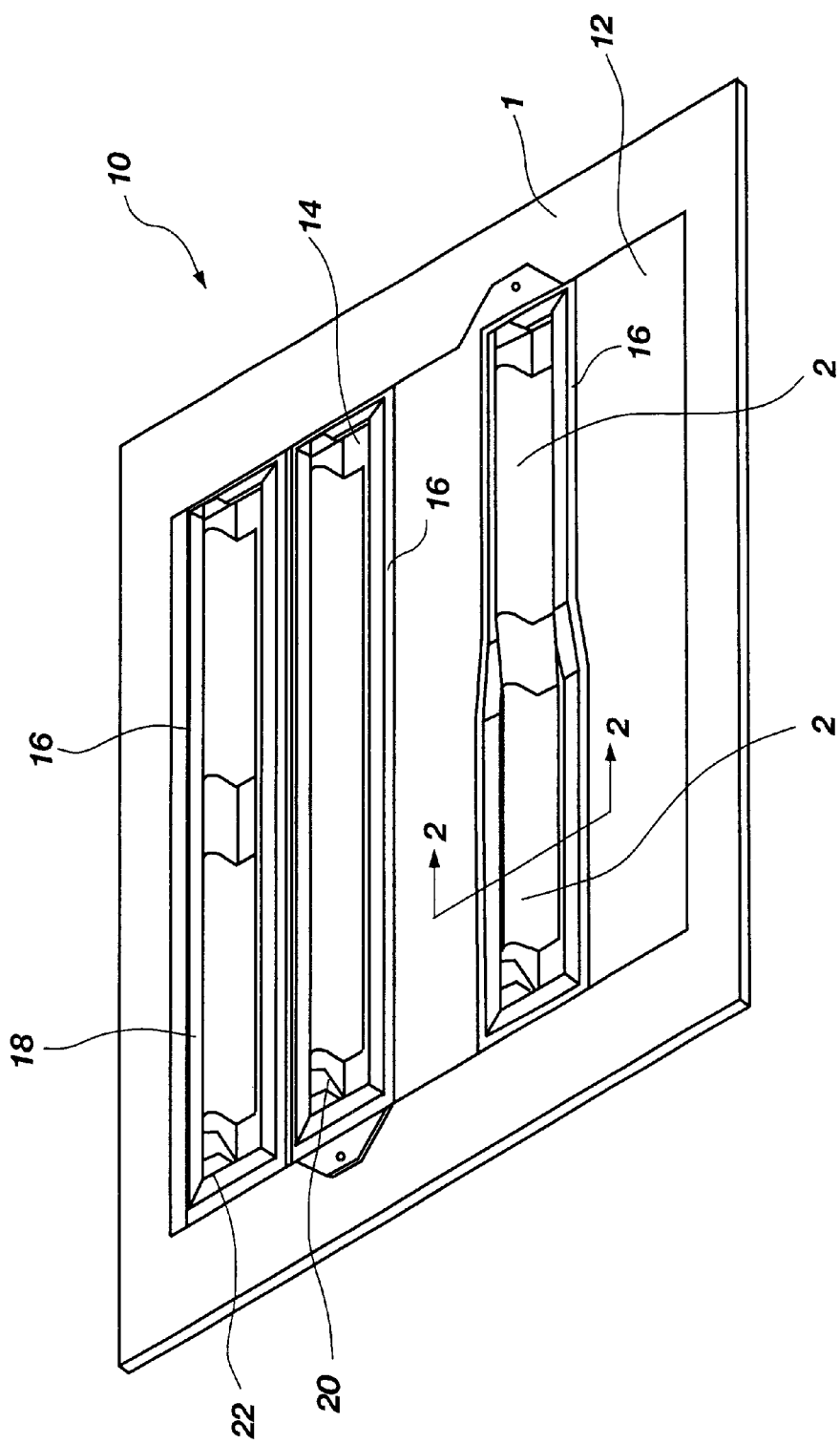
FIG. 1 is a perspective of a portion of the present invention in conjunction with a portion of a composite structure.

Referring to drawing FIG. 1, a portion of the present invention of a conformable locating aperture system (CLAS) 10 used for the formation of composite structures is illustrated. A sheet 1 of uncured fiber composite material, such as graphite fibers coated with a suitable uncured adhesive material, is illustrated having a plurality of reinforcing stringers 2 of uncured fiber composite material, such as graphite fibers coated with a suitable uncured adhesive material, attached thereto by the uncured adhesive of the sheet 1 and stringers 2 being in contact. The sheet 1 is formed of one or more layers or plies of suitable fiber material with the fiber material being coated with a suitable uncured adhesive material which is to be cured under temperature and pressure in an autoclave. Typically, the sheet 1 may be formed of six, eight or more layers or plies of fiber material depending upon the desired and required strength of the sheet 1 after curing. Similarly, a stringer 2 may be formed in any desired shape from one or more layers or plies of suitable fiber material with the fiber material being coated with a suitable uncured adhesive material to be cured under temperature and pressure in an autoclave. Additionally, if the stringer 2 is to be part of a composite assembly including the sheet 1, the sheet 1 will have the stringer 2 attached thereto during the curing of the adhesive of both the sheet 1 and stringer 2 in an autoclave under temperature and pressure for the curing such adhesive material so that the cured adhesive material secures the fiber material together of each layer or ply forming the sheet 1 or stringer 2 as well as securing the sheet 1 and stringer 2 together. Typically, a stringer may be formed from six, eight or more layers or plies of suitable fiber material. The number and shape of the stringers to be attached to the sheet being determined by the desired and required strength of the sheet and attached stringers during the use of such a combination, such as a component of an aircraft, aerospace vehicle, static structure, etc.

The geometric shape of the sheet 1 and the stringers 2 may be any desired shape. For instance, the sheet 1 may contain simple or complex curves therein, be of any physical size, be rectangular in shape, square in shape, triangular in shape, etc. The stringers 2 may have any desired cross-sectional shape or configuration, may be of any size, may vary in height, vary in cross-section from one location to another, include reinforcing members of any shape thereon at any desired location, etc. Also, the stringers 2 may be located on the sheet 1 in any position, such as extending longitudinally, extending transversely, extending both longitudinally and transversely, etc.

Further illustrated in drawing FIG. 1, the conformable locating aperture system 10 of the present invention comprises a caul 12 having a plurality of apertures 14 therein, each aperture 14 having a stringer 2 of the sheet 1 extending therethrough. It is preferred that the caul 12 be formed of layers or plies of the same fiber coated with the same adhesive as the fiber and adhesive used for sheet 1 and/or stringer 2. For example, if the sheet 1 is formed of layers or plies of graphite fiber material coated with an adhesive compound, the caul 12 is preferred to be formed of layers or plies of graphite fiber material coated with the same adhesive compound, the adhesive compound being cured, rather than being uncured or green, to form a structure having the fibers embedded in the cured adhesive. The number of layers or plies of fiber coated with adhesive used to form the caul 12 being determined by the requirements that the caul 12 must be flexible, yet strong enough to conform to the geometric shape of the sheet 1 to which the stringers 2 are to be attached while having sufficient strength to retain the stringer 2 in the desired position on the sheet 1 during curing and attachment in an autoclave. For instance, if the sheet 1 is formed of six layers or plies of graphite fiber coated with a suitable adhesive having a complex shape and one or more curves therein, the caul 12 may be a sheet of two cured layers graphite fiber secured together using thee same suitable adhesive used for the sheet 1. The openings 14 in the caul 12 may be of any shape so long as they are the shape as that of the base of the stringer 2 which extends through the opening 14. An opening 14 may vary is size or width along its length, if the stringer 2 varies in size and/or width so that the stringer 2 may extend therethrough, such as is illustrated in drawing FIG. 1. An opening 14 may be formed in caul 12 by any suitable method, such as forming the caul 12 having openings therein from fiber material and adhesive, then cutting, sawing, etc. the opening 14 in a caul 12 formed as solid sheet. An opening 14 in the caul 12 should be formed having its inner edge located adjacent the bottom of the stringer 2 extending therethrough as illustrated in drawing FIGS. 2 through 14 herein to locate the stringer 2 on the sheet 1 in the desired position thereon.

Still referring to drawing FIG. 1, surrounding each opening 14 in the caul 12 is an alignment rail 16. The alignment rail 16 is secured to the caul 12 to provide a known alignment location on the caul 12 which is placed and secured in a known location with respect to the sheet 1 and stringers 2. The alignment rail 16 is preferred to comprise any suitable material flexible enough to comply with the caul 12 which must conform to the geometric configuration and shape of sheet 1. The preferred material to form an alignment rail 16 is one or more layers of man-made fibers for generalized use in the industrial arts, such as a para-aramid fiber produced from poly-paraphenylene terephthalamide, although any suitable fiber may be used, adhesively secured to the caul 12 and each other using an adhesive. The preferred combination of material and an adhesive used to form alignment rail 16 is TX-4401 3M Brand ETAB System, available from the 3M Company, which is a combination of a para-aramid fiber produced from poly-paraphenylene terephthalamide and an adhesive. Alternatively, the para-aramid fiber produced from poly-paraphenylene terephthalamide may be purchased as a woven material in the form of a cloth and subsequently coated with a suitable adhesive, such as TX-4400 3M Brand ETAB System, available from the 3M Company to form the alignment rail 16. In this manner, the use of a material and adhesive, such as TX-4401 3M Brand ETAB System, available from the 3M Company, provides a high strength, yet flexible, alignment rail 16 secured to the caul 12 in a known location. It should be understood that the known location of the alignment rail 16, the opening 14 in the caul 12, and the relative location of each other with respect to each other are features of the present invention as the sheet 1 of uncured or green adhesive and multi-layers or plies of material has the caul 12 of the present invention placed thereon then aligned in the proper position on the sheet 1 so that the stringers 2 of uncured adhesive and multi-layers or plies of material are then located on the sheet 1 using the openings 14 and the alignment rails 16 of the caul 12. In this manner, the stringers 2 are located in the proper desired position on the sheet 1 for the curing and attachment thereof.

The conformable locating aperture system 10 of the present invention further comprises side formers 18, end formers 20, and intensifier formers 22 which are used to position and temporarily secure the stringers 2 in position on the sheet 1 for the curing and attachment of the sheet 1 and stringers 2 in an autoclave under temperature and pressure. The side formers 18, end formers 20, and intensifier formers 22 may be comprised of any suitable material which is flexible to conform with the cross-sectional shape and longitudinal shape of the stringers 2 and geometric shape and configuration of the sheet 1 as well as be easily installed engaging the stringers 2 and sheet 1 and easily removed therefrom after the curing and attachment of the stringers 2 and sheet 1 under temperature and pressure in an autoclave. A preferred manufacturing method for the formers 18, 20,and 22 is to cast or form such members using precision molds having the desired mating size and configuration of the portion of the stringer 2 and sheet 1 which the former is to mate in use. A preferred material for the side formers 18, end formers 20, and intensifier formers 22 comprises silicone based elastomeric material having a durometer hardness of thirty (30) or forty (40) or greater. The silicone based elastomeric material initially being a liquid poured into the precision mold to solidify to the desired former configuration 18, 20, and 22. Silicone based elastomer materials exhibit good casting characteristics in the desired configurations, exhibit good flexibility characteristics, good strength characteristics at elevated temperature and pressure in an autoclave, easy removal from the cured and attached stringers 2 and sheet 1, and good ability to allow movement due to the mismatch of the coefficients of thermal expansion between the material of the formers 18, 20, and 22 and the material of the stringers 2 and sheet 1 between the formers 18, 20, and 22 and the stringers 2 and sheet 1 under temperature and pressure in an autoclave during the curing and attachment and consolidation of the stringers 2 and sheet 1 while, at the same time, being capable of maintaining the position and alignment of the stringers 2 regarding the sheet 1 during the curing and attachment process in the autoclave. While silicone based elastomers are preferred for the formers 18, 20, and 22, any suitable materials having the characteristics set forth hereinabove may be used. For instance, butadiene synthetic rubber elastomers may be used for the formers 18, 20, and 22.

Referring to drawing FIG. 2, illustrated in cross-section is a portion of a sheet 1, stringer 2, caul 12 having an opening 14 therein for stringer 2, and portion of alignment rails 16. As illustrated, the sheet 1 comprises multi-layers or plies of fiber material and adhesive. Located on or over the sheet 1 is a stringer 2 comprising a member having an s-shaped cross-section formed of multi-plies or layers of fiber material and a suitable adhesive. The base 3 of the stringer 2 engages the sheet 1 while the stem 4 extends thereabove having the rail-like top 5 formed on the upper end of the stem 4. The stringer 2 may also include a reinforcing member 6 having any desired shape and/or cross-section located at any desired position thereon. The caul 12 is formed having an opening 14 in a known location therein for the stringer 2 to extend therethrough. The inner edge 24 of the opening 14 in the caul 12 is located adjacent the stringer 2 such that the inner edge 24 is located adjacent the edge of each side of the base 3. Preferably, the inner edges of each layer of the multi-layers 26 or plies of material and adhesive forming the alignment rail 16 form a vertical inner edge 24 adjacent each side of the base 3 of the stringer 2 while the outer edge of the alignment rail 16 formed by the multi-layers 26 or plies of material and adhesive form stepped outer edge 24'.

The alignment rails 16 are adhesively attached surrounding the opening 14 in caul 12 comprise one or more multiple-layers or plies of para-aramid fiber produced from poly-paraphenylene terephthalamide and an adhesive, such as TX-4401 3M Brand ETAB System, available from the 3M Company, forming vertical inner edges 24 located adjacent the stringer 2 and stepped outer edges 24'. The stepped outer edges 24' helping facilitate removal of air from the vacuum enclosure (See FIG. 20.) during the curing and attachment and consolidation of the sheet 1 and stringers 2. As illustrated, the alignment rails 16 are formed in multiple layers 26 of multi-layered or multiple plies of material to form the vertical inner edges 24 and stepped outer edges 24'.

Referring to drawing FIG. 3, illustrated in cross-section are a sheet 1 having a stringer 2 and a caul 12 having an aperture 14 for the stringer 2 to extend therethrough and having alignment rails 16 formed of layers 26 surrounding the aperture 14. The stringer 2 comprises a member having a base 3, stem 4, rail-like top 5, and reinforcing members 6 and 7 located at desired locations on the stem 4 thereof to add reinforcement to the stringer 2 where desired. As illustrated in drawing FIG. 2, the alignment rails 16 are adhesively secured to the caul 12. In this instance, as well as any embodiment set forth herein of the present invention, the adhesive attachment of an alignment rail 16 to the caul 12 includes the attachment of an alignment rail 16 in an uncured state with the preferred adhesive material to a caul 12 in an uncured state using the preferred adhesive therewith and the subsequent curing of both the alignment rail 16 and caul 12. For instance, if a rubber based adhesive is used to form an alignment rail 16 and another type adhesive is used to form the caul 12, the curing of the adhesive of an alignment rail 16 and a caul 12 when in contact will form an adhesive attachment therebetween for the purposes of the present invention. In this manner, a wide variety of adhesives may be used to form an alignment rail 16 and caul 12 as a cured assembly.

Referring to drawing FIG. 4, illustrated cross-section are a sheet 1 having a stringer 2 and a caul 12 having an aperture 14 for the stringer 2 to extend therethrough and having alignment rails 16 formed of layers 26 surrounding the aperture 14. The stringer 2 comprises a member having a base 3, stem 4, rail like top 5, and reinforcing members 6 and 7 located at desired locations on the stem 4 thereof to add reinforcement to the stringer 2 where desired. As illustrated, the alignment rails 16 and the caul 12 are formed having apertures 28 and 30, respectively, formed therein for a suitable fastener 32 to extend therethrough to secure the alignment rails 16 to the caul 12, rather than the alignment rails being adhesively attached to the caul 12. If desired, the alignment rails 16 may both be secured adhesively and mechanically to the caul 12.

Figure 20:
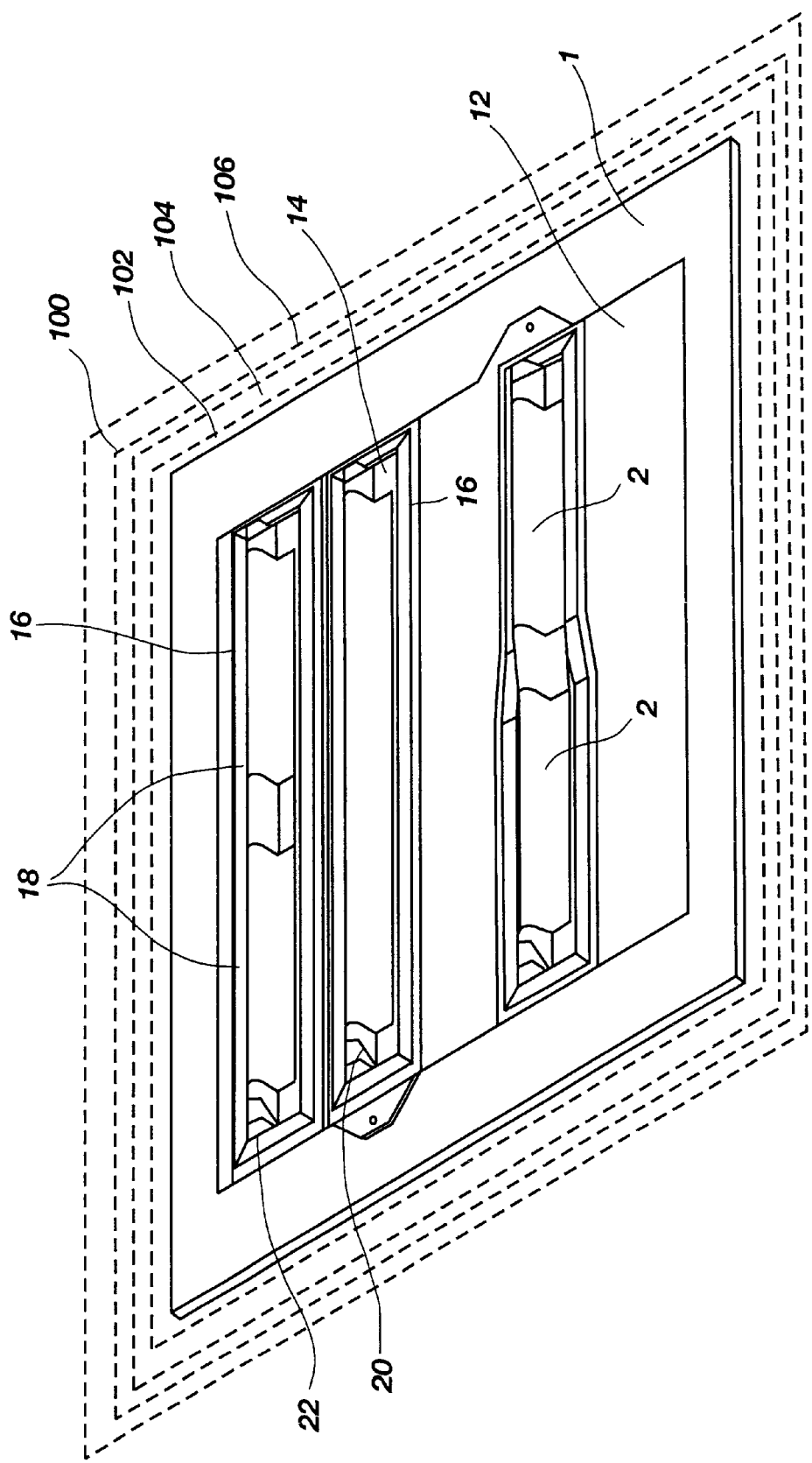
FIG. 20 is a view of the present invention in an autoclave environment.

Referring to drawing FIG. 5, illustrated in cross-section are a sheet 1 having a stringer 2 and a caul 12 having an aperture 14 for the stringer 2 to extend therethrough and having alignment rails 16 formed of layers 26 surrounding the aperture 14. The stringer 2 comprises a member having a base 3, stem 4, rail-like top 5, and reinforcing members 6 and 7 located at desired locations on the stem 4 thereof to add reinforcement to the stringer 2 where desired. As illustrated in drawing FIG. 2, the alignment rails 16 are adhesively secured to the caul 12. Further illustrated in drawing FIG. 5, are typical side formers 18 mating with inner edges 24 of the alignment rails 16 and portions of the stringer 2. As shown, the side formers 18 comprise a side former 34, side former 36, and side former 38. The side former 34 comprises an elongated member having a portion 39 thereof engaging inner edge 24 of alignment rail 16, a portion 40 engaging base 3 of stringer 2, a portion 42 engaging one side of stem 4 of stringer 2, a portion 44 engaging one side of rail-like top 5 of stringer 2. The side former 36 comprises an elongated member having a portion 48 engaging a portion of sheet 1, a portion 50 engaging the inner edge 24 of alignment rail 16, a portion 52 engaging a side of stem 4 of stringer 2 and of reinforcing member 6 attached to the side of stem 3 of stringer 2, a portion 54 engaging a side of rail-like top 5 of stringer 2, and a upper surface 56. The side former 38 comprises an elongated member having a portion 56 thereof engaging a portion of side former 34, a portion 58 thereof engaging upper surface 60 of side former 36 and abuts the end of rail-like top 5 of stringer 2. The side former 38 serves to enclose the stringer 2 longitudinally between side former 34, side former 36 and side former 38 so that during the curing of the sheet 1 and stringer 2 as well as attaching the stringer 2 to the sheet 1 under temperature and pressure in an autoclave, at least a portion of one of the side formers 34, 36, and 38 comprising a side former 18 engages a portion of the stringer 2 to apply pressure thereto and to keep the stringer 2 aligned and positioned with respect to the caul 12 and, more importantly, with respect to the desired location of the stringer 2 on the sheet 1. By the portion 39 of the side former 34 and the portion 50 of the side former 36 engaging the alignment rails 16 surrounding the aperture 14 in the caul 12 and the caul 12 being releasably secured in the desired position with respect to the sheet 1, the stringer 2 is properly located in the desired position for the curing of the sheet 1 and stringer 2 as well as the attachment of the stringer 2 to the sheet 1 under temperature and pressure in the autoclave. As previously discussed, while the caul 12, sheet 1, and stringer 2 have the same coefficient of thermal expansion as they are formed of the same fiber material and adhesive, the side former 18 comprised for side formers 34, 36, and 38 have a different coefficient of thermal expansion as the side formers 34, 36, and 38 are made of a suitable silicone based material for the expansion and contraction thereof with respect to the sheet 1, stringer 2, and caul 12 without substantially sticking thereto to prevent the curing and attachment of the stringer 2 to the sheet 1 at an incorrect position. Not illustrated in drawing FIG. 5, but rather refer to drawing FIG. 20, are the sheet release film and sheet of breather material covering the sheet 1, caul 12, and side formers 18, end formers 20 (not shown), and intensifier formers 22 (not shown) as well as the vacuum enclosure or bag (not shown) used in the curing and attachment of the stringer 2 to the sheet 1 in the autoclave. If desired, the side formers 34 and 36 may either be formed having the side former 38 or portions thereof integral with one or both of side formers 34 and 36.

Referring to drawing FIG. 6, illustrated in cross-section are a sheet 1 having a stringer 2 and a caul 12 having an aperture 14 for the stringer 2 to extend therethrough and having alignment rails 16 formed of layers 26 surrounding the aperture 14. The stringer 2 comprises a member having a base 3, stem 4, and rail like top 5. As illustrated in drawing FIG. 2, the alignment rails 16 are adhesively secured to the caul 12. Further illustrated in drawing FIG. 6, are typical side formers 18 mating with inner edges 24 of the alignment rails 16 and portions of the stringer 2. As shown, the side formers 18 comprise a side former 34, side former 36, and side former 38. The side former 34 comprises an elongated member having a portion 39 thereof engaging inner edge 24 of alignment rail 16, a portion 40 engaging base 3 of stringer 2, a portion 42 engaging one side of stem 4 of stringer 2, a portion 44 engaging one side 5' of rail-like top 5 of stringer 2. The side former 36 comprises an elongated member having a portion 48 engaging a portion of sheet 1, a portion 50 engaging the vertical inner edge 24 of alignment rail 16, a portion 52 engaging a side of stem 4 of stringer 2, a portion 54 engaging a side 5" of rail-like top 5 of stringer 2. The side former 38 comprises an elongated member having a portion 56 thereof abutting the end or side of rail-like tip 5 of stringer 2, a portion 58 thereof engaging a portion of former 34, and a portion 62 engaging a portion of side former 36. The side former 38 serves to longitudinally enclose the stringer 2 between side former 34, side former 36, and side former 38 so during the curing of the sheet 1 and stringer 2 as well as attaching the stringer 2 to the sheet 1 under temperature and pressure in an autoclave, at least a portion of one of the side formers 34, 36, and 38 comprising a side former 18 engages the stringer 2 to apply pressure thereto and to keep the stringer 2 aligned and positioned with respect to the caul 12 and, more importantly, with respect to the desired location of the stringer 2 on the sheet 1. By the portion 39 of the side former 34 and the portion 50 of the side former 36 engaging the alignment rails 16 surrounding the aperture 14 in the caul 12 and the caul 12 being releasably secured in the desired position with respect to the sheet 1, the stringer 2 is properly located in the desired position for the curing of the sheet 1 and stringer 2 as well as the attachment of the stringer 2 to the sheet 1 under temperature and pressure in the autoclave. As previously discussed, while the caul 12, sheet 1, and stringer 2 have the same coefficient of thermal expansion as they are formed of the same fiber material and adhesive, the side former 18 comprised for side formers 34, 36, and 38 have a different coefficient of thermal expansion as the side formers 34, 36, and 38 are made of a suitable silicone based material for the expansion and contraction thereof with respect to the sheet 1, stringer 2, and caul 12 without substantially sticking thereto to prevent the curing and attachment of the stringer 2 to the sheet 1 at an incorrect position. Not illustrated in drawing FIG. 5 are the sheet of release film and breather material (not shown) covering the sheet 1, caul 12, and side formers 18, end formers 20 (not shown), and intensifier formers 22 (not shown) as well as the vacuum enclosure (not shown) used in the curing and attachment of the stringer 2 to the sheet 1 in the autoclave. (See drawing FIG. 20.)

Referring to drawing FIG. 7, illustrated in cross-section are a sheet 1 having a stringer 2 and a caul 12 having an aperture 14 for the stringer 2 to extend therethrough and having alignment rails 16 formed of layers 26 surrounding the aperture 14. The a stringer 2 comprises a member having a base 3, stem 4, and rail like top 5. As illustrated in drawing FIG. 2, the alignment rails 16 are adhesively secured to the caul 12. The alignment rails 16 include recesses 16' therein for the side formers 18 to have a portion thereof mate therewith for alignment purposes. Further illustrated in drawing FIG. 7, are typical side formers 18 mating with inner edges 24 and recess 16' of the alignment rails 16 and portions of the stringer 2. As shown, the side formers 18 comprise a side former 34 and side former 36. The side former 34 comprises an elongated member having a portion 39 thereof engaging inner edge 24 of alignment rail 16 and a portion 34' engaging recess 16' of alignment rail 16, a portion 40 engaging base 3 of stringer 2, a portion 42 engaging one side of stem 4 of stringer 2, a portion 44 engaging one side 5' of rail-like top 5 of stringer 2, and a portion 46 for engaging the end surface to rail-like top 5. The side former 36 comprises an elongated member having a portion 48 engaging a portion of sheet 1, a portion 50 engaging the inner edge 24 of alignment rail 16 and a portion 36' engaging recess 16' of alignment rail 16, a portion 52 engaging a side of stem 4 of stringer 2, a portion 54 engaging a side of rail like top 5 of stringer 2, and a upper surface 56 engaging a portion 46 of side former 34. By the portions 39 and 34' of the side former 34 and the portions 50 and 36' of the side former 36 engaging the alignment rails 16 surrounding the aperture 14 in the caul 12 and the caul 12 being releasably secured in the desired position with respect to the sheet 1, the stringer 2 is properly located in the desired position for the curing of the sheet 1 and stringer 2 as well as the attachment of the stringer 2 to the sheet 1 under temperature and pressure in the autoclave. As previously discussed, while the caul 12, sheet 1, and stringer 2 have the same coefficient of thermal expansion as they are formed of the same fiber material and adhesive, the side former 18 comprised for side formers 34 and 36 have a different coefficient of thermal expansion as the side formers 34 and 36 are made of a suitable silicone based material for the expansion and contraction thereof with respect to the sheet 1, stringer 2, and caul 12 without substantially sticking thereto to prevent the curing and attachment of the stringer 2 to the sheet 1 at an incorrect position. Not illustrated in drawing FIG. 5 are the sheet of release film and breather material (not shown) covering the sheet 1, caul 12, and side formers 18, end formers 20 (not shown), and intensifier formers 22 (not shown) as well as the vacuum enclosure (not shown) used in the curing and attachment of the stringer 2 to the sheet 1 in the autoclave. (See drawing FIG. 20.)

Referring to drawing FIG. 8, illustrated in cross-section is a portion of a sheet 1, stringer 2, caul 12 having an opening 14 therein for stringer 2, and portion of alignment rails 16. As illustrated, the sheet 1 comprises multi-layers 26 or plies of fiber material and adhesive. Located on or over the sheet 1 is a stringer 2 comprising a member having an s-shaped cross-section formed of multi-plies or layers of fiber material and a suitable adhesive. The base 3 of the stringer 2 engages the sheet 1 while the stem 4 extends thereabove having the rail-like top 5 formed on the upper end of the stem 4. The stringer 2 may also include a reinforcing member 6 having any desired shape and/or cross-section located at any desired position thereon. The caul 12 is formed having an opening 14 in a known location therein for the stringer 2 to extend therethrough. The inner edge 24 of the opening 14 in the caul 12 is located adjacent the stringer 2 such that the inner edge 24 is located adjacent the edge of each side of the base 3. As an alternative embodiment of the present invention, the inner edges of each layer of the multi-layers 26 or plies of material and adhesive forming the alignment rail 16 form a stepped inner edge 24 adjacent each side of the base 3 of the stringer 2 while the outer edge of the alignment rail 16 formed by the multi-layers 26 or plies of material and adhesive form stepped outer edge 24'.

The alignment rails 16 are adhesively attached surrounding the opening 14 in caul 12 comprise one or more multiple-layers or plies of para-aramid fiber produced from poly-paraphenylene terephthalamide and an adhesive, such as TX-4401 3M Brand ETAB System, available from the 3M Company, forming inner edges 24 located adjacent the stringer 2 and stepped outer edges 24'. As illustrated, the alignment rails 16 are formed in multiple layers 26 of multi-layered or multiple plies of material to form the stepped inner edges 24 and stepped outer edges 24'.

Referring to drawing FIG. 9, illustrated in cross-section are a sheet 1 having a stringer 2 and a caul 12 having an aperture 14 for the stringer 2 to extend therethrough and having alignment rails 16 formed of layers 26 surrounding the aperture 14. The stringer 2 comprises a member having a base 3, stem 4, rail-like top 5, and reinforcing members 6 and 7 located at desired locations on the stem 4 thereof to add reinforcement to the stringer 2 where desired. As illustrated in drawing FIG. 2, the alignment rails 16 are adhesively secured to the caul 12 having stepped inner edges 24 and stepped outer edges 24'.

Referring to drawing FIG. 10, illustrated cross-section are a sheet 1 having a stringer 2 and a caul 12 having an aperture 14 for the stringer 2 to extend therethrough and having alignment rails 16 formed of layers 26 surrounding the aperture 14. The stringer 2 comprises a member having a base 3, stem 4, rail like top 5, and reinforcing members 6 and 7 located at desired locations on the stem 4 thereof to add reinforcement to the stringer 2 where desired. As illustrated, the alignment rails 16 and the caul 12 are formed having apertures 28 and 30, respectively, formed therein for a suitable fastener 32 to extend therethrough to secure the alignment rails 16 to the caul 12, rather than the alignment rails being adhesively attached to the caul 12. If desire, the alignment rails 16 may both be secured adhesively and mechanically to the caul 12. As illustrated, the alignment rails 16 are formed with stepped inner edges 24 and stepped outer edges 24'.

Referring to drawing FIG. 11, , illustrated in cross-section are a sheet 1 having a stringer 2 and a caul 12 having an aperture 14 for the stringer 2 to extend therethrough and having alignment rails 16 formed of layers 26 surrounding the aperture 14. The stringer 2 comprises a member having a base 3, stem 4, rail-like top 5, and reinforcing members 6 and 7 located at desired locations on the stem 4 thereof to add reinforcement to the stringer 2 where desired. As illustrated in drawing FIG. 2, the alignment rails 16 are adhesively secured to the caul 12. Further illustrated in drawing FIG. 5, are typical side formers 18 mating with stepped inner edges 24 an stepped outer edges 24' of the alignment rails 16 and portions of the stringer 2. As shown, the side formers 18 comprise a side former 34, side former 36, and side former 38. The side former 34 comprises an elongated member having a portion 39 thereof engaging stepped inner edge 24 of alignment rail 16, a portion 40 engaging base 3 of stringer 2, a portion 42 engaging one side of stem 4 of stringer 2, a portion 44 engaging one side of rail-like top 5 of stringer 2, and a recess 46 formed therein. The side former 36 comprises an elongated member having a portion 48 engaging a portion of sheet 1, a portion 50 engaging the inner edge 24 of alignment rail 16, a portion 52 engaging a side of stem 4 of stringer 2 and of reinforcing member 6 attached to the side of stem 3 of stringer 2, a portion 54 engaging a side of rail-like top 5 of stringer 2, and a upper surface 56. The side former 38 comprises an elongated member having a portion 58 thereof engaging a portion of side former 34, a portion 58' thereof engaging upper surface 56 of side former 36. The side former 38 serves to enclose the stringer 2 longitudinally between side former 34, side former 36 and side former 38 so that during the curing of the sheet 1 and stringer 2 as well as attaching the stringer 2 to the sheet 1 under temperature and pressure in an autoclave, at least a portion of one of the side formers 34, 36, and 38 comprising a side former 18 engages a portion of the stringer 2 to apply pressure thereto and to keep the stringer 2 aligned and positioned with respect to the caul 12 and, more importantly, with respect to the desired location of the stringer 2 on the sheet 1. By the portion 39 of the side former 34 and the portion 50 of the side former 36 engaging the alignment rails 16 surrounding the aperture 14 in the caul 12 and the caul 12 being releasably secured in the desired position with respect to the sheet 1, the stringer 2 is properly located in the desired position for the curing of the sheet 1 and stringer 2 as well as the attachment of the stringer 2 to the sheet 1 under temperature and pressure in the autoclave. As previously discussed, while the caul 12, sheet 1, and stringer 2 have the same coefficient of thermal expansion as they are formed of the same fiber material and adhesive, the side former 18 comprised for side formers 34, 36, and 38 have a different coefficient of thermal expansion as the side formers 34, 36, and 38 are made of a suitable silicone based material for the expansion and contraction thereof with respect to the sheet 1, stringer 2, and caul 12 without substantially sticking thereto to prevent the curing and attachment of the stringer 2 to the sheet 1 at an incorrect position. Not illustrated in drawing FIG. 12 are the sheet release film and sheet of breather material covering the sheet 1, caul 12, and side formers 18, end formers 20 (not shown), and intensifier formers 22 (not shown) as well as the vacuum enclosure or bag (not shown) used in the curing and attachment of the stringer 2 to the sheet 1 in the autoclave. If desired, the side formers 34 and 36 may either be formed having the side former 38 or portions thereof integral with one or both of side formers 34 and 36.

Referring to drawing FIG. 12, illustrated in cross-section are a sheet 1 having a stringer 2 and a caul 12 having an aperture 14 for the stringer 2 to extend therethrough and having alignment rails 16 formed of layers 26 surrounding the aperture 14. The stringer 2 comprises a member having a base 3, stem 4, and rail like top 5. As illustrated in drawing FIG. 2, the alignment rails 16 are adhesively secured to the caul 12 having stepped inner edges 24 and stepped outer edges 24'. Further illustrated in drawing FIG. 12, are typical side formers 18 mating with stepped inner edges 24 of the alignment rails 16 and portions of the stringer 2. As shown, the side formers 18 comprise a side former 34, side former 36, and side former 38. The side former 34 comprises an elongated member having a portion 39 thereof engaging stepped inner edge 24 of alignment rail 16, a portion 40 engaging base 3 of stringer 2, a portion 42 engaging one side of stem 4 of stringer 2, a portion 44 engaging one side 5' of rail-like top 5 of stringer 2. The side former 36 comprises an elongated member having a portion 48 engaging a portion of sheet 1, a portion 50 engaging the stepped inner edge 24 of alignment rail 16, a portion 52 engaging a side of stem 4 of stringer 2, a portion 54 engaging a side 5" of rail-like top 5 of stringer 2. The side former 38 comprises an elongated member having a portion 58 thereof engaging a portion of former 34, and a portion 62 engaging a portion of side former 36. The side former 38 serves to longitudinally enclose the stringer 2 between side former 34, side former 36, and side former 38 so during the curing of the sheet 1 and stringer 2 as well as attaching the stringer 2 to the sheet 1 under temperature and pressure in an autoclave, at least a portion of one of the side formers 34, 36, and 38 comprising a side former 18 engages the stringer 2 to apply pressure thereto and to keep the stringer 2 aligned and positioned with respect to the caul 12 and, more importantly, with respect to the desired location of the stringer 2 on the sheet 1. By the portion 39 of the side former 34 and the portion 50 of the side former 36 engaging the alignment rails 16 surrounding the aperture 14 in the caul 12 and the caul 12 being releasably secured in the desired position with respect to the sheet 1, the stringer 2 is properly located in the desired position for the curing of the sheet 1 and stringer 2 as well as the attachment of the stringer 2 to the sheet 1 under temperature and pressure in the autoclave. As previously discussed, while the caul 12, sheet 1, and stringer 2 have the same coefficient of thermal expansion as they are formed of the same fiber material and adhesive, the side former 18 comprised for side formers 34, 36, and 38 have a different coefficient of thermal expansion as the side formers 34, 36, and 38 are made of a suitable silicone based material for the expansion and contraction thereof with respect to the sheet 1, stringer 2, and caul 12 without substantially sticking thereto to prevent the curing and attachment of the stringer 2 to the sheet 1 at an incorrect position. Not illustrated in drawing FIG. 12 are the sheet of release film and breather material (not shown) covering the sheet 1, caul 12, and side formers 18, end formers 20 (not shown), and intensifier formers 22 (not shown) as well as the vacuum enclosure (not shown) used in the curing and attachment of the stringer 2 to the sheet 1 in the autoclave.

Referring to drawing FIG. 13, illustrated in cross-section are a sheet 1 having a stringer 2 and a caul 12 having an aperture 14 for the stringer 2 to extend therethrough and having alignment rails 16 formed of layers 26 surrounding the aperture 14. The stringer 2 comprises a member having a base 3, stem 4, and rail like top 5. As illustrated in drawing FIG. 2, the alignment rails 16 are adhesively secured to the caul 12. The alignment rails 16 have stepped inner edges 24 and stepped outer edges 24'. The alignment rails 16 include recesses 16' therein for the side formers 18 to have a portion thereof mate therewith for alignment purposes. Further illustrated in drawing FIG. 13, are typical side formers 18 mating with stepped inner edges 24 and recess 16' of the alignment rails 16 and portions of the stringer 2. As shown, the side formers 18 comprise a side former 34 and side former 36. The side former 34 comprises an elongated member having a portion 39 thereof engaging inner edge 24 of alignment rail 16 and a portion 34' engaging recess 16' of alignment rail 16, a portion 40 engaging base 3 of stringer 2, a portion 42 engaging one side of stem 4 of stringer 2, a portion 44 engaging one side 5' of rail-like top 5 of stringer 2, and a portion 46 for engaging the end surface to rail-like top 5. The side former 36 comprises an elongated member having a portion 48 engaging a portion of sheet 1, a portion 50 engaging the inner edge 24 of alignment rail 16 and a portion 36' engaging recess 16' of alignment rail 16, a portion 52 engaging a side of stem 4 of stringer 2, a portion 54 engaging a side of rail like top 5 of stringer 2, and a upper surface 56 engaging a portion 46 of side former 34. By the portions 39 and 34' of the side former 34 and the portions 50 and 36' of the side former 36 engaging the alignment rails 16 surrounding the aperture 14 in the caul 12 and the caul 12 being releasably secured in the desired position with respect to the sheet 1, the stringer 2 is properly located in the desired position for the curing of the sheet 1 and stringer 2 as well as the attachment of the stringer 2 to the sheet 1 under temperature and pressure in the autoclave. As previously discussed, while the caul 12, sheet 1, and stringer 2 have the same coefficient of thermal expansion as they are formed of the same fiber material and adhesive, the side former 18 comprised for side formers 34 and 36 have a different coefficient of thermal expansion as the side formers 34 and 36 are made of a suitable silicone based material for the expansion and contraction thereof with respect to the sheet 1, stringer 2, and caul 12 without substantially sticking thereto to prevent the curing and attachment of the stringer 2 to the sheet 1 at an incorrect position. Not illustrated in drawing FIG. 13 are the sheet of release film and breather material (not shown) covering the sheet 1, caul 12, and side formers 18, end formers 20 (not shown), and intensifier formers 22 (not shown) as well as the vacuum enclosure (not shown) used in the curing and attachment of the stringer 2 to the sheet 1 in the autoclave.

Figure 14:
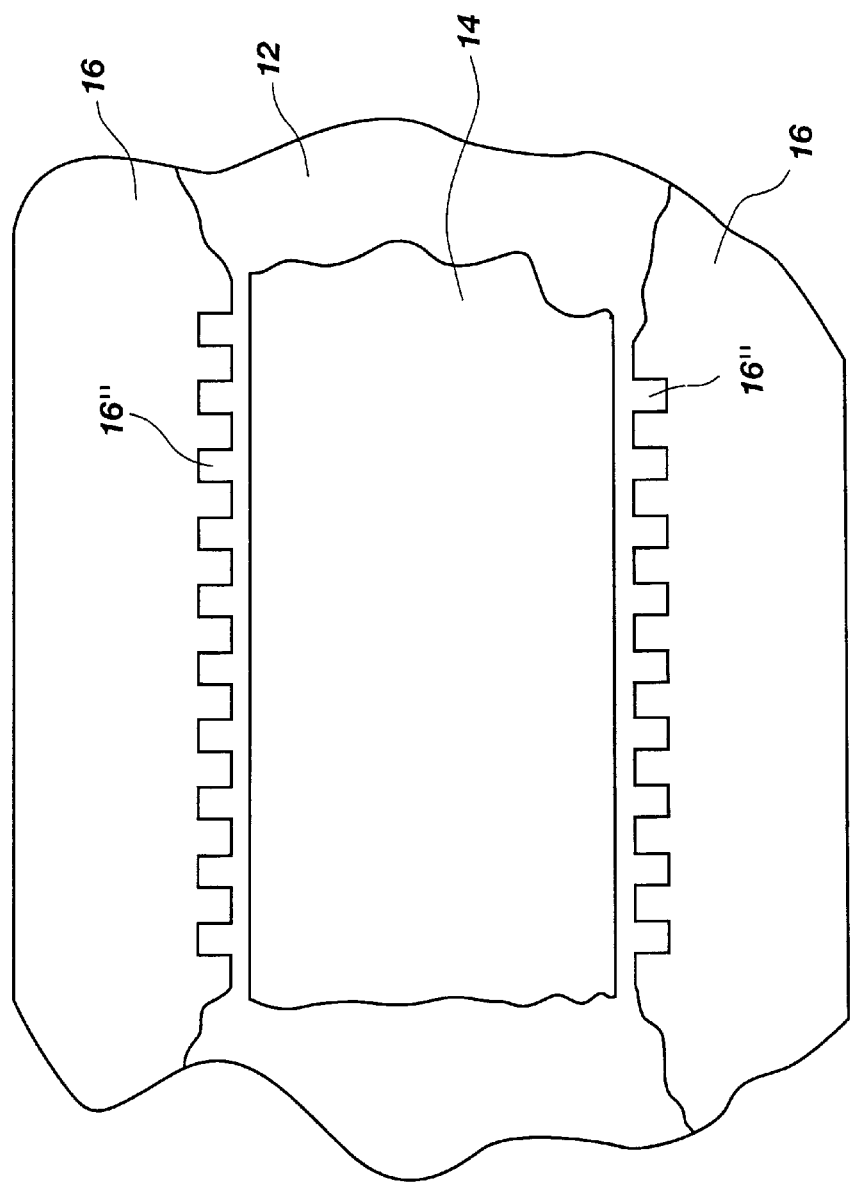
FIG. 14 is a top view of a portion of the caul of the present invention.

Referring to drawing FIG. 14, illustrated is a portion of the caul 12 having a portion of the aperture 14 and a portion of the alignment rail 16 shown. The alignment rail 16 may include a plurality of recesses or notches 16' therein for mating with a side former 18 and/or end former 20 for location purposes of the side former 18 or end former 20 with respect to the caul 12 and stringer 2. The recesses or notches 16" may be of any desired configuration for location purposes. That is, the recesses or notches 16" may extend longitudinally, transversely, or both and be of any desired shape and geometric configuration.

Figure 15:
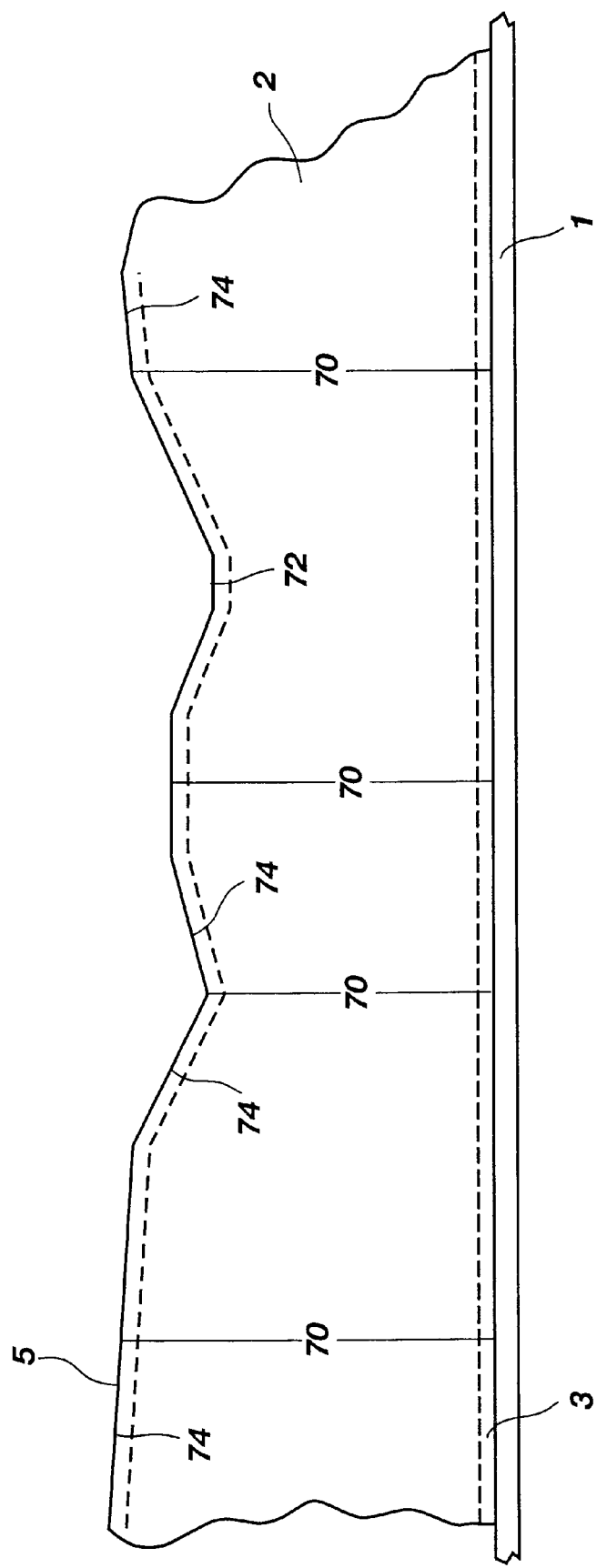
FIG. 15 is a side view of a portion of the present invention.

Referring to drawing FIG. 15, illustrated is a portion of a stringer 2 having the base 3 thereof located on a sheet 1. As illustrated, the stringer 2 is formed having rail like top 5 varying in height 70 from the sheet 1 and formed having at least one curve surface 72 therein as well as having angular surfaces 74 therein. In this manner, a stringer 2 may be formed of any geometric shape and cross-section required for the desired strength characteristics of the composite structure of which the stringer 2 is included.

Figure 16:
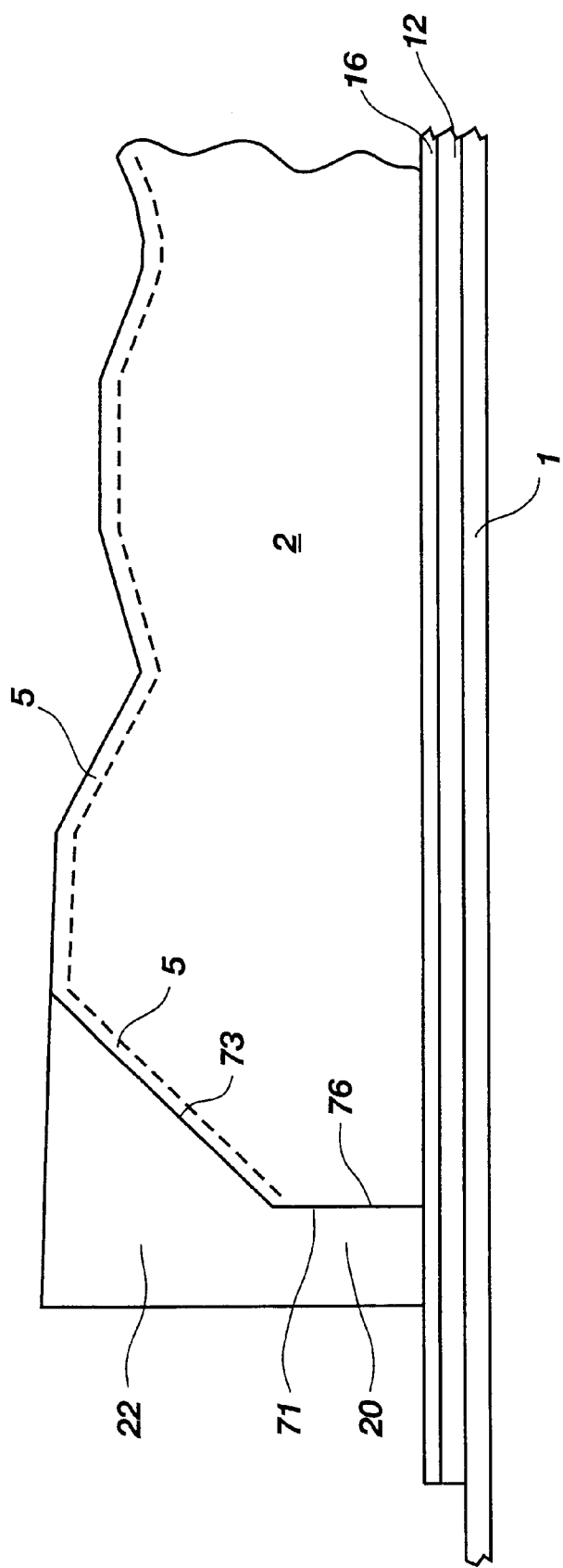
FIG. 16 is a side view of a portion of the present invention.

Referring to drawing FIG. 16, illustrated is a stringer 2 on a sheet 1 extending through an aperture 14 (not shown) in a caul 12 having alignment rail 16 surrounding the aperture 14. Further illustrated, are end formers 20, and intensifier formers 22 which are formed as a unified one-piece member, rather than as separate members. The end former 20 and intensifier member 22 are used as a spacer between side formers 18, such as side formers 24 and 36 described herein, to position the side formers 34 and 36 extending on each side of stringer 2 and temporarily enclose the stringers 2 in position on the sheet 1 for the curing and attachment of the sheet 1 and stringers 2 in an autoclave under temperature and pressure. It is preferred that the end formers 20 and intensifier formers 22, whether a one-piece member or separate members, do not engage alignment rail 16 but, rather are retained between side formers 18, such as side former 34 and side former 36 described herein acting somewhat as a spacer with respect to the side former 34 and side former 36. As an alternative, in some instances, the end former 20 and end intensifiers 22 whether a one-piece member or separate members may engage alignment rail 16 so that such members are located in a known position with respect to the caul 12, opening 14 therein, and stringer 2. As illustrated, the stringer 2 is formed having a substantial vertical end surface portion 70 with respect to the sheet 1 and caul 12 and angular end surface portion 72 with respect to other portions of rail like top 5 and with respect to the sheet 1 and caul 12. As previously discussed, the side formers 18 and one piece end formers 20 and intensifier formers 22 may be comprised of any suitable material which is flexible to conform with the cross-sectional shape and longitudinal shape of the stringers 2 and geometric shape and configuration of the sheet 1 as well as be easily installed engaging the stringers 2 and sheet 1 and removed therefrom after the curing and attachment of the stringers 2 and sheet 1 under temperature and pressure in an autoclave. A preferred manufacturing method for the side formers 18, end formers 20, and intensifier formers 22 is to cast or form such members using molds having the desired mating size and configuration of the portion of the stringer 2 and sheet 1 which the former is to mate in use. A preferred material for the side formers 18, end formers 20, and intensifier formers 22 comprises a silicone based elastomeric material having a durometer hardness of forty (40) or greater which is initially a liquid poured into the mold to solidify to the desired former configuration 18, 20, and 22. Silicone based elastomer materials exhibit good casting characteristics in the desired configurations, exhibit good flexibility characteristics, good strength characteristics at elevated temperature and pressure in an autoclave, easy removal from the cured and attached stringers 2 and sheet 1, and good ability to allow movement due to the mismatch of the coefficients of thermal expansion between the material of the side formers 18, end formers 20, and intensifier formers 22 and the material of the stringers 2 and sheet 1 between the side formers 18, end formers 20, and intensifier formers 22 and the stringers 2 and sheet 1 under temperature and pressure in an autoclave during the curing and attachment of the stringers 2 and sheet 1 while being capable of maintaining the position and alignment of the stringers 2 regarding the sheet 1 during the curing and attachment process in the autoclave. While silicone based elastomers are preferred for the formers 18, 20, and 22, any suitable materials having the characteristics set forth hereinabove may be used. For instance, butadiene synthetic rubber elastomers may be used, rather than silicone based elastomers, for the side formers 18, end formers 20, and intensifier formers 22. The end former comprises a member having any desired geometric shape and configuration to mate with the end surface 76 of stringer 2. The intensifier former 22 comprises a member having any desired geometric shape and configuration to mating with end former 20 as a one-piece member and the surface 72 of the rail-like surface 5 of the stringer.

Figure 17:
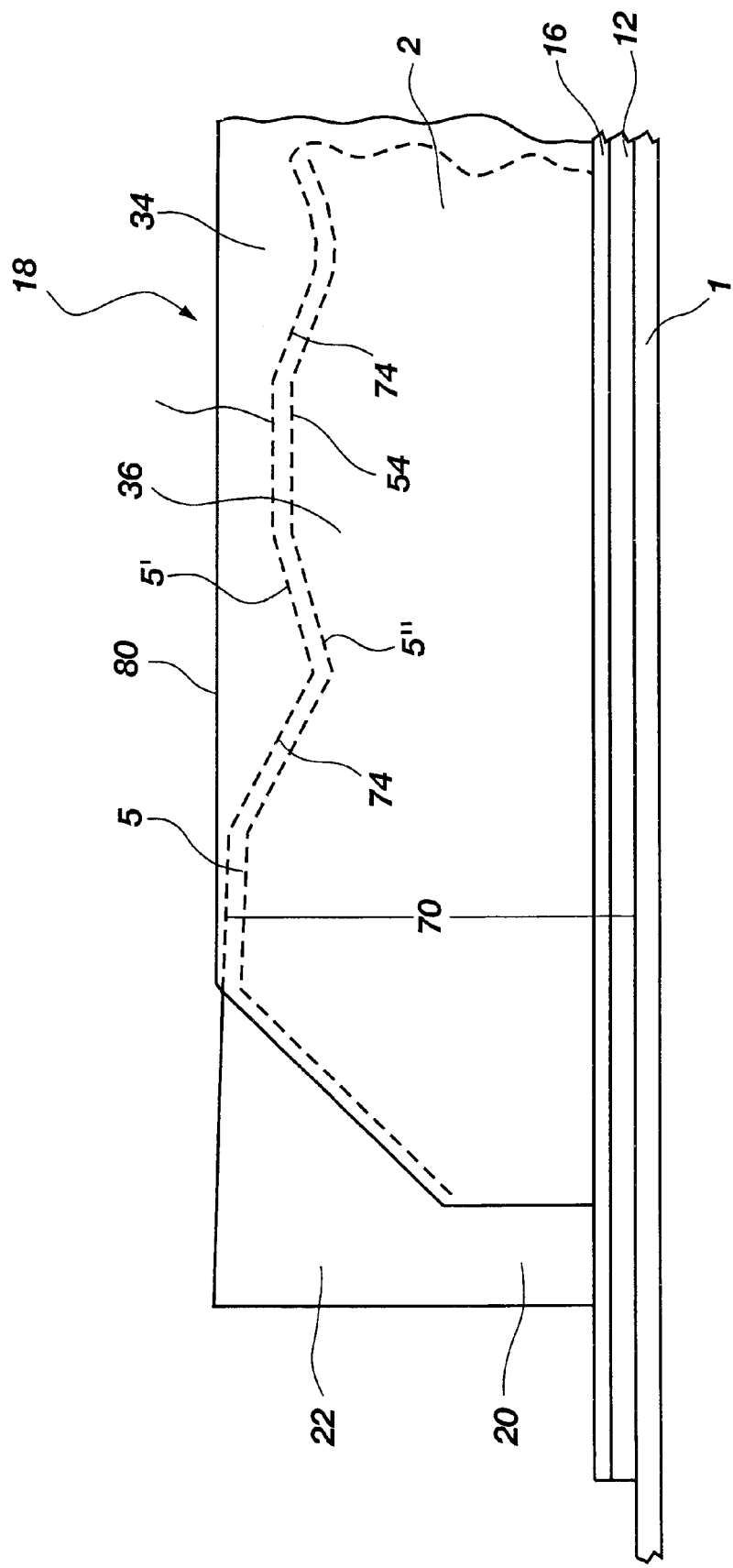
FIG. 17 is a side view of a portion of the present invention.

Referring to drawing FIG. 17, illustrated is a sheet 1 having a stringer 2 extending through an aperture 14 (not shown) in a caul 12 having side former 18 engaging a portion of the stringer 2, an end former 20 engaging a portion of the end of stringer 2, and intensifier former 22 formed as a one-piece member along with end former 20 and stringer 2. As illustrated, the stringer 2 includes a rail like top 5 which varies in height 70 with respect to the sheet 1 and includes angular surfaces 74 thereon. As illustrated, side former 34 is formed with a substantially constant height upper surface 80 with respect to the caul 12 having the portion 44 of the side former 36 configured to extend over the raillike top 5 of the stringer 2, the portion 44 configured to accommodate the side 5' of the rail-like top 5 of stringer 2. The other mating side former 36 is configured having the portion 54 thereof configured to accommodate the side 5' of the rail like top 5 of the stringer 2 and having a portion thereof extending above the rail like top 5 of the stringer 2 to surface 80 of the side former 34 abutting portions of the side former 34 extending above the rail like top 5 of the stringer 2. In this manner, another side former 38, as previously illustrated, would not be required as the stringer would be surrounded by portions of both side former 34 and side former 36 in the autoclave for the curing and attachment of the sheet 1 and stringer 2. As previously discussed, the one-piece end former 20 and intensifier formed 22 do not preferably engage alignment rail 16 but, if desired, the one-piece member may do so.

Figure 18:
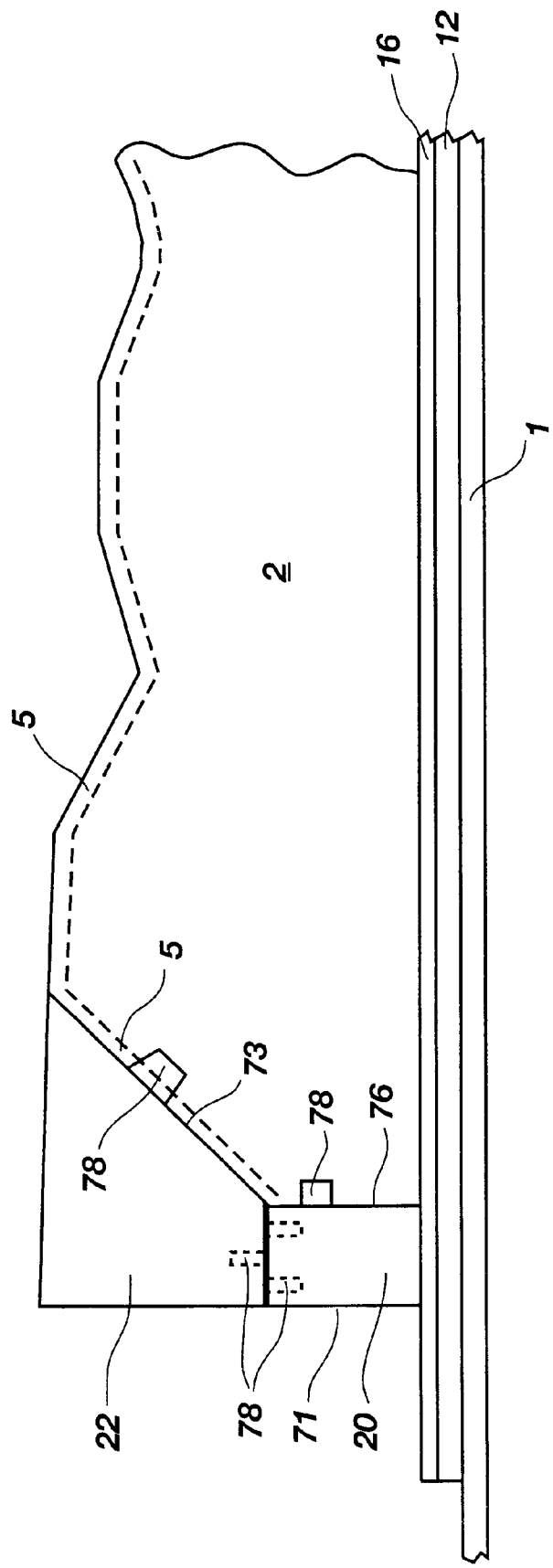
FIG. 18 is a side view of a portion of an alternative embodiment of the present invention.

Referring to drawing FIG. 18, illustrated is a stringer 2 on a sheet 1 extending through an aperture 14 (not shown) in a caul 12 having alignment rail 16 surrounding the aperture 14. Further illustrated, are end formers 20, and intensifier formers 22 which are used to position and temporarily secure the stringers 2 in position on the sheet 1 for the curing and attachment of the sheet 1 and stringers 2 in an autoclave under temperature and pressure. As illustrated, the stringer 2 is formed having a substantial vertical end surface portion 70 with respect to the sheet 1 and caul 12 and angular end surface portion 72 with respect to other portions of rail like top 5 and with respect to the sheet 1 and caul 12. As previously discussed, the side formers 18, end formers 20, and intensifier formers 22 may be comprised of any suitable material which is flexible to conform with the cross-sectional shape and longitudinal shape of the stringers 2 and geometric shape and configuration of the sheet 1 as well as be easily installed engaging the stringers 2 and sheet 1 and removed therefrom after the curing and attachment of the stringers 2 and sheet 1 under temperature and pressure in an autoclave. A preferred manufacturing method for the side formers 18, end formers 20,and intensifier formers 22 is to cast or form such members using molds having the desired mating size and configuration of the portion of the stringer 2 and sheet 1 which the former is to mate in use. A preferred material for the side formers 18, end formers 20, and intensifier formers 22 comprises a silicone based elastomeric material having a durometer hardness of forty (40) or greater which is initially a liquid poured into the mold to solidify to the desired former configuration 18, 20, and 22. Silicone based elastomer materials exhibit good casting characteristics in the desired configurations, exhibit good flexibility characteristics, good strength characteristics at elevated temperature and pressure in an autoclave, easy removal from the cured and attached stringers 2 and sheet 1, and good ability to allow movement due to the mismatch of the coefficients of thermal expansion between the material of the side formers 18, end formers 20, and intensifier formers 22 and the material of the stringers 2 and sheet 1 between the side formers 18, end formers 20, and intensifier formers 22 and the stringers 2 and sheet 1 under temperature and pressure in an autoclave during the curing and attachment of the stringers 2 and sheet 1 while being capable of maintaining the position and alignment of the stringers 2 regarding the sheet 1 during the curing and attachment process in the autoclave.

While silicone based elastomers are preferred for the formers 18, 20, and 22, any suitable materials having the characteristics set forth hereinabove may be used. For instance, butadiene synthetic rubber elastomers may be used, rather than silicone based elastomers, for the side formers 18, end formers 20, and intensifier formers 22. The end former comprises a member having any desired geometric shape and configuration to mate with the end surface 76 of stringer 2. The intensifier former 22 comprises a member having any desired geometric shape and configuration to mate with an associated end former 20 and the surface 72 of the rail like surface 5 of the stringer and the end former 20. Both the end former 20 and intensifier former 22 may be formed having portions 78 thereof to engage each other to retain them in position with respect to each other and portions of the stringer 2. In this instance, the end former 20 and intensifier former 22 are formed as separate members having portions 76 thereof engaging each other as well as having portions thereof engaging stringer 2.

Figure 19:
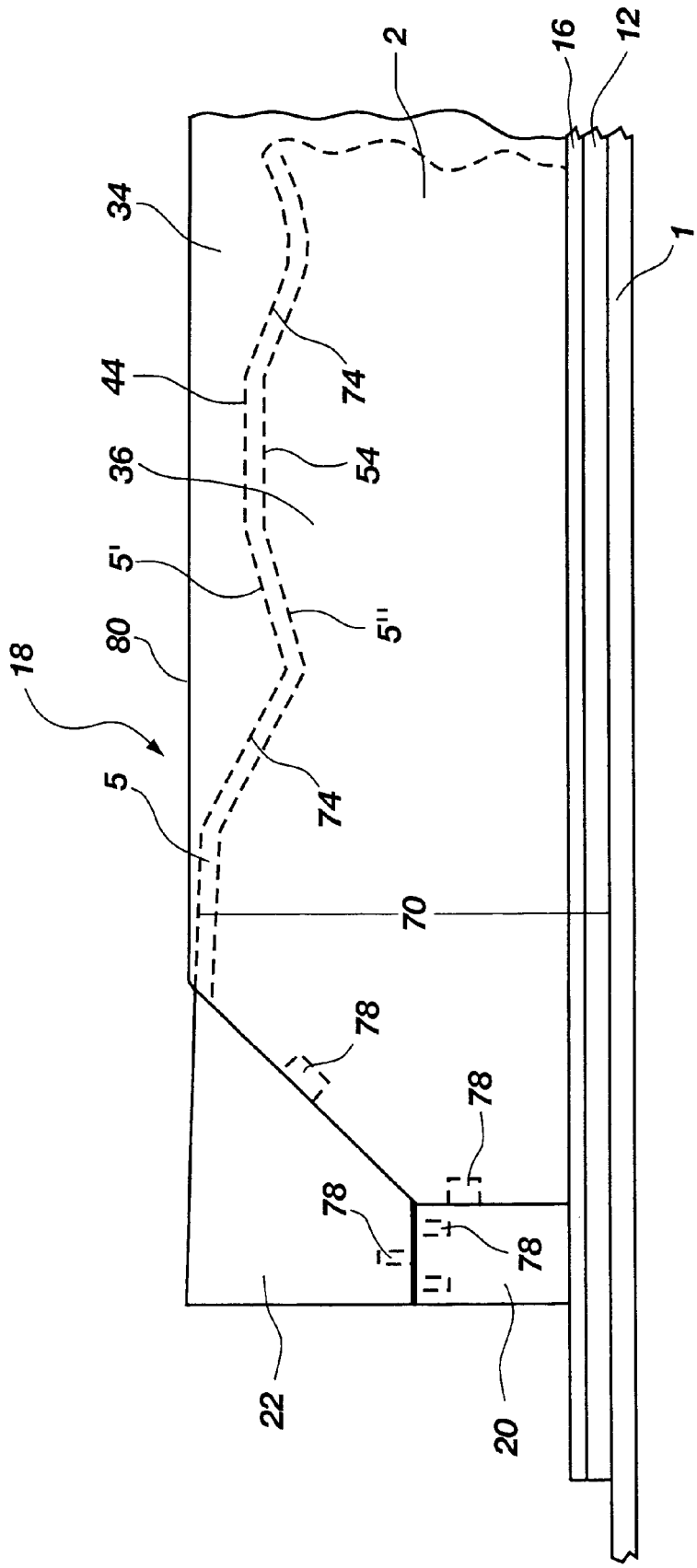
FIG. 19 is a side view of a portion of an alternative embodiment of the present invention.

Referring to drawing FIG. 19, illustrated is a sheet 1 having a stringer 2 extending through an aperture 14 (not shown) in a caul 12 having side former 18 engaging a portion of the stringer 2, an end former 20 engaging a portion of the end of stringer 2, and intensifier former 22 engaging a portion of end former 20 and stringer 2. As illustrated, the stringer 2 includes a rail like top 5 which varies in height 70 with respect to the sheet 1 and includes angular surfaces 74 thereon. As illustrated, side former 34 is formed with a substantially constant height upper surface 80 with respect to the caul 12 having the portion 44 of the side former 36 configured to extend over the rail-like top 5 of the stringer 2, the portion 44 configured to accommodate the side 5' of the rail-like top 5 of stringer 2. The other mating side former 36 is configured having the portion 54 thereof configured to accommodate the side 5" of the rail like top 5 of the stringer 2 and having a portion thereof extending above the rail like top 5 of the stringer 2 to surface 80 of the side former 34 abutting portions of the side former 34 extending above the rail like top 5 of the stringer 2. In this manner, another side former 38, as previously illustrated, would not be required as the stringer would be surrounded by portions of both side former 34 and side former 36 in the autoclave for the curing and attachment of the sheet 1 and stringer 2. As is illustrated in drawing FIG. 17, the end former 20 and intensifier former 22 are formed as separate members having portions 78 thereof engaging each other and engaging portions of stringer 2.

Referring to drawing FIG. 20, illustrated is a sheet 1 having stringers 2 thereon extending through apertures 14 in a caul 12 with portions of the stringers 2 having side formers 18, end formers 20, and intensifier formers 22 engaging the same for locating the stringer 2 on the sheet 1 for the curing and attachment of the sheet 1 and stringer 2 in an autoclave 100 (illustrated in broken lines). Further illustrated, is a release sheet 102 (illustrated in broken lines) of any suitable commercially available material located over the top of sheet 1 and the side formers 18, end formers 20, and intensifier formers 22. The release sheet allowing the easy removal of any member from the sheet 1, stringer 2, caul 12, side formers 18, end formers 20 and intensifier formers 22 after removal from the autoclave 100. Located over release sheet 102 is a breather sheet 104 which allows the movement of air through a vacuum enclosure 106 during the removal of the atmosphere of air therefrom. The breather sheet 104 may be any suitable commercially available material to allow the movement of air in the vacuum enclosure 106. As stated, the sheet 1, stringer 2, side formers 18, end formers 20, intensifier formers 22, and resilient sheet 102 are contained within a vacuum enclosure 106, typically referred to as a vacuum bag, for the curing and attachment of the sheet 1 and stringers 2 under temperature and pressure in the autoclave 100. While it is preferred to use an autoclave to cure and attach the sheet 1 and stringer 2, in some instances, depending upon the adhesive used to coat the fiber material forming the sheet 1 and stringer 2, rather than use an autoclave for curing and attachment, a simple oven may be used in conjunction with the vacuum enclosure 106 with the vacuum enclosure 106, once evacuated, providing the necessary force for the curing and attachment and consolidation of the sheet 1 and stringer 2.

For commonly used graphite fiber material and adhesive used to form the sheet 1 and stringers 2, when placed into the autoclave 100, the vacuum enclosure 102 is evacuated of air thereby causing the resilient sheet 102 to engage the side formers 18, end formers 20, and intensifier formers 22 as well as the caul 12. The side formers 18, end formers 20, and intensifier formers 22 are positioned around the stringers 2 being located in the proper position on the caul 12 by having portions of the side formers 18 and end formers 20 engaging portions of the alignment rails 18 located on the caul 12. In turn, the caul 12 is positioned in the proper relationship to the sheet 1 having the stringers 2 extending through apertures 14 in the caul 12 with the sheet 1 and caul 12 being releasably secured together for the curing and attachment process in the autoclave 100. The curing and attachment of the sheet 1 and stringers 2 will typically proceed in the autoclave 100. Using typical commonly available graphite fiber material and adhesive material, the sheet 1 and stringers 2 will be cured and secured to each other in the autoclave at a pressure of approximately 100 pounds per square inch and at a temperature of approximately 350° F. for a period of time until the sheet 1 and stringers 2 are cured and attached. At such time, the sheet 1 having stringers 2 secured thereon are removed from the autoclave 100. After cooling for a period of time, the sheet 1 and stringers 2 are removed from the vacuum enclosure 104 and breather sheet 104 and the release sheet 102 removed from the sheet 1, caul 12 and side formers 18, end formers 20, and intensifier formers 22. The side formers 18, end formers 20, and intensifier formers 22 are removed from engaging portions of the sheet 1, caul 12, and stringers 2 and, the caul 12 removed from the sheet 1. In this manner, the sheet 1 and stringers 2 have been cured and attached in the autoclave to help ensure that the sheet 1 and stringers 2 are properly cured as well as properly attached under the most favorable conditions in the autoclave 100 in the proper positions on the sheet 100 using the conformable locating aperture system 10 of the present invention. It should be understood that since the alignment rails 16 surrounding the apertures 14 in the caul 12 are precisely located in known positions on the caul 12 which is positioned in the proper position engaging the sheet 1 and since the side formers 18 and end formers 20 are precision formed elastomeric materials which are assembled in position surrounding the stringers 2 on sheet 1 being positioned and aligned by portions of the side formers 18 and end formers 20 engaging portions of the alignment rails 16 on caul 12 with the side formers 18 and end formers engaging portions of the stringers 2, the stringers 2 are securely held in the desired positions on the sheet 1 without having the ability for relative movement with respect to each other. It should be further appreciated that when the vacuum enclosure 106 is evacuated of air, the atmospheric forces acting on the caul 12, side formers 18, end formers 20, and intensifier formers 22 increases proportionately which force is transferred to the sheet 1 and stringers 2 to more firmly hold the stringers 2 in position on the sheet 1 for the curing and attachment and consolidation of the sheet 1 and stringers 2 in the autoclave 100. It should be additionally appreciated that when the pressure is increased in the autoclave 100 for the curing and attachment process of the sheet 1 and stringers 2, the forces acting on the conformable locating aperture system 10 of the present invention are increased, which forces are transferred to the sheet 1 and stringers 2 to even more firmly hold them in proper alignment during the curing and attachment and consolidation thereof in the autoclave 100.

It should be appreciated and understood that changes, additions, deletions, and modifications may be made to the present invention which clearly are encompassed therein. For instance, depending upon the shape and configuration of the stringers to be cured and attached to the sheet, the side formers and end formers may have any required shape and configuration. Similarly, the intensifier formers may not be required depending upon the shape and configuration of the stringers. The apertures in the caul and the alignment rails may have any desire configuration so long as at least portions of the stringers extend therethrough. Additionally, either a separate release member or release coatings may be used between the sheet and caul or on the sheet and caul so long as such a member or coatings comply with the configuration of the sheet. The stringers may be located in any direction on the sheet, such as along a longitudinal axis of the sheet, a transverse axis of the sheet, or both or combinations thereof so long as it is possible to use the conformable locating aperture system of the present invention with the sheet and stringers. The alignment rail may have any desired inner edge configuration, such as stepped, vertical wall, slotted, curving wall, etc. capable of mating with an associated former. While the caul 12 is placed on the sheet 1 prior to the location of the stringers 2 thereon, the stringers 2 may be placed on the sheet 1 and the caul 12 placed thereover on the sheet 1.

What is claimed is:

1. A method of manufacturing a composite structure having a first member and a second member, said method comprising:

providing a first member of fiber material coated with an adhesive;

providing a second member of fiber material coated with an adhesive;

placing the second member on a portion of the first member in a location to be attached thereto;

providing a resilient member having at least one aperture therein and an alignment rail surrounding the aperture, the resilient member engaging at least a portion of said first member having at least a portion of said second member extending through the aperture;

providing at least one side former having a portion engaging a portion of the alignment rail surrounding the aperture in the resilient member and a portion engaging at least a portion of said second member to align said second member with respect to said first member; and providing at least one end former having a portion for engaging a portion of the alignment rail surrounding the aperture in the resilient member and a portion engaging at least a portion of said second member to align said second member with respect to said first member.

2. The method of claim 1, further comprising:

providing at least one intensifier member; and engaging a portion of the at least one end former and a portion of the second member with a portion of the intensifier member.

3. The method of claim 1, further comprising:

providing at least one intensifier member; and engaging a portion of the at least one side former and a portion of the second member with a portion of the intensifier member.

4. The method of claim 1, further comprising:

providing at least one intensifier member; and engaging a portion of the at least one side former, a portion of the at least one end former, and a portion of the second member with a portion of the intensifier member.

5. The method of claim 1, further comprising:

conforming the resilient member to substantially engage portions of the first member.

6. The method of claim 1, further comprising:

providing at least one other side former; and engaging at least a portion of the second member with a portion of the at least one other side former.

7. The method of claim 6, wherein at least a portion of the at least one other side former engages a portion of the alignment rail of the resilient member.

8. The method of claim 1, further comprising:

providing a vacuum member; and placing the first member, the second member, the resilient member, the at least one side former, and the at least one end former in the vacuum member.

9. The method of claim 8, further comprising:

removing the atmosphere from within the vacuum member.

10. The method of claim 9, further comprising:

providing an autoclave; and placing the vacuum member in the autoclave.

11. The method of claim 9, further comprising:

providing an autoclave;

placing the vacuum member in the autoclave; and increasing a temperature in the autoclave to cure the first member and the second member.

12. The method of claim 9, further comprising:

providing an autoclave;

placing the vacuum member in the autoclave; and increasing a temperature in the autoclave to cure the adhesive of the first member, to cure the adhesive of the second member, and to adhesively secure the first member and the second member with the cured adhesive.

13. The method of claim 9, further comprising:

providing an autoclave;

placing the vacuum member in the autoclave;

increasing a pressure within the autoclave; and increasing a temperature in the autoclave to cure the adhesive of the first member, to cure the adhesive of the second member, and to adhesively secure the first member and the second member with the cured adhesive.

* * * * *